United States Patent
Liu

(10) Patent No.: US 7,457,973 B2
(45) Date of Patent: Nov. 25, 2008

(54) SYSTEM AND METHOD FOR PRIORITIZING DATA TRANSMISSION AND TRANSMITTING SCHEDULED WAKE-UP TIMES TO NETWORK STATIONS BASED ON DOWNLINK TRANSMISSION DURATION

(75) Inventor: Yonghe Liu, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1193 days.

(21) Appl. No.: 10/600,673

(22) Filed: Jun. 20, 2003

(65) Prior Publication Data

US 2005/0003794 A1 Jan. 6, 2005

(51) Int. Cl.
*G06F 1/00* (2006.01)

(52) U.S. Cl. ............... 713/310; 713/300; 713/320; 370/229; 370/230; 370/232; 370/235; 370/455; 370/458; 370/519; 455/512; 455/343.4

(58) Field of Classification Search ............... 713/300, 713/310, 320; 370/229, 230, 232, 235, 442, 370/444, 455, 458, 519; 455/512, 343.4
See application file for complete search history.

(56) References Cited

U.S. PATENT DOCUMENTS

| | | | |
|---|---|---|---|
| 4,449,248 A | | 5/1984 | Leslie et al. |
| 5,241,542 A | * | 8/1993 | Natarajan et al. ......... 370/311 |
| 5,317,571 A | * | 5/1994 | Marcel et al. ............. 370/508 |
| 5,475,374 A | * | 12/1995 | Moore .................. 340/825.22 |
| 5,745,860 A | | 4/1998 | Kallin |
| 6,141,336 A | * | 10/2000 | Bauchot et al. ............ 370/348 |
| 6,192,230 B1 | * | 2/2001 | van Bokhorst et al. ... 455/343.3 |
| 6,285,892 B1 | | 9/2001 | Hulyalkar |

(Continued)

OTHER PUBLICATIONS

Modiano, E., "Scheduling packet transmissions in a multi-hop packet switched network based on message length," Computer Communications and Networks, 1997. Proceedings., Sixth International Conference on , vol., no., pp. 350-357, Sep. 22-25 1997.*

(Continued)

*Primary Examiner*—Thomas Lee
*Assistant Examiner*—Jaweed A Abbaszadeh
(74) *Attorney, Agent, or Firm*—Steven A. Shaw; W. James Brady; Frederick J. Telecky, Jr.

(57) ABSTRACT

A new system and method is described, utilizing a scheduler based on a transmission time calculation and prioritizing algorithm. The system utilizes a Schedule Information Vector (SIV) protocol for saving power in wireless local area networks. The system comprises an access point having a priority queue, one or more stations, an SIV frame comprising an association ID for identifying one of the stations and a scheduled wake-up time for the identified station. An algorithm is employed for calculating the transmission time of downlink data for the stations. The access point originates and transmits to the one or more stations the SIV frame of the scheduled wake-up times. The current data to be transmitted to each station is accessed by the algorithm to determine the total transmission time to each station. A priority queue in the access point is ordered from the shortest to the longest transmission, assigning the highest priority to the shortest power save transmission to minimize the total power consumption of the network.

28 Claims, 12 Drawing Sheets

U.S. PATENT DOCUMENTS

| | | | | |
|---|---|---|---|---|
| 6,314,087 | B1 * | 11/2001 | Oh | 370/252 |
| 6,438,375 | B1 * | 8/2002 | Muller | 455/435.3 |
| 6,463,307 | B1 * | 10/2002 | Larsson et al. | 455/574 |
| 6,480,476 | B1 * | 11/2002 | Willars | 370/311 |
| 6,512,741 | B1 * | 1/2003 | Kohzuki et al. | 370/230.1 |
| 6,526,062 | B1 * | 2/2003 | Milliken et al. | 370/395.42 |
| 6,564,074 | B2 * | 5/2003 | Romans | 455/574 |
| 6,665,520 | B2 * | 12/2003 | Romans | 455/13.4 |
| 6,690,655 | B1 * | 2/2004 | Miner et al. | 370/278 |
| 6,694,149 | B1 * | 2/2004 | Ady et al. | 455/522 |
| H002103 | H * | 5/2004 | Modiano | 370/230 |
| 6,895,450 | B2 * | 5/2005 | Mahany et al. | 710/18 |
| 6,909,881 | B2 * | 6/2005 | Uehara et al. | 455/69 |
| 6,950,684 | B2 * | 9/2005 | Goldberg | 455/574 |
| 6,965,566 | B2 * | 11/2005 | Kawasaki et al. | 370/235 |
| 7,020,893 | B2 * | 3/2006 | Connelly | 725/97 |
| 7,035,240 | B1 * | 4/2006 | Balakrishnan et al. | 370/338 |
| 7,126,913 | B1 * | 10/2006 | Patel et al. | 370/230.1 |
| 7,142,521 | B2 * | 11/2006 | Haugli et al. | 370/320 |
| 2002/0164024 | A1 * | 11/2002 | Arakawa et al. | 380/210 |
| 2002/0172217 | A1 * | 11/2002 | Kadaba et al. | 370/443 |
| 2003/0002518 | A1 * | 1/2003 | Shibutani | 370/442 |
| 2003/0125031 | A1 * | 7/2003 | Sung Lim et al. | 455/447 |
| 2003/0125040 | A1 * | 7/2003 | Walton et al. | 455/454 |
| 2003/0203740 | A1 * | 10/2003 | Bahl et al. | 455/516 |
| 2003/0220118 | A1 * | 11/2003 | Chhabra | 455/459 |
| 2004/0184475 | A1 * | 9/2004 | Meier | 370/449 |
| 2004/0264397 | A1 * | 12/2004 | Benveniste | 370/311 |
| 2005/0237984 | A1 * | 10/2005 | Benveniste | 370/338 |

OTHER PUBLICATIONS

Chih-Shun Hsu; Jang-Ping Sheu; Yu-Chee Tseng, "Minimize waiting time and conserve energy by scheduling transmissions in IEEE 802.11-based ad hoc networks," Telecommunications, 2003. ICT 2003. 10th International Conference on , vol. 1, no., pp. 393-399 vol. 1, Feb. 23-Mar. 1, 2003 URL: http://ieeexplore.ieee.org/iel5/8474/26699/01191264.pdf?isnumber=2.*

"The IEEE 802.11 Standard", INRIA, Planete Team, Planete, IMAD AAD, In'Tech, May 31, 2002, 52 pgs.

"Implementation Experiences of Bandwidth Guarantee on a Wireless LAN", Srikant Sharma, Kartik Gopalan, Ningning Zhu, Gang Peng, Pradipta De and Tzi-Cker Chiueh, taken from the Internet at: www.ecsl.cs.sunysb.edu/~chiueh/cse634/wrether.pdf, date unknown, 22 pages.

"Power Saving in Wireless LANs via Schedule Information Vector", Yonghe Liu, date unknown, 4 pgs.

"Qos Support on IEEE 802.11a (IEEE 802.11e)" Ph. Rouzet, Jan. 26, 2002, 16 pgs.

"A Short Tutorial on Wireless LANs and IEEE 802.11", Daniel L. Lough, T. Keith Blankenship and Kevin J. Krizman, taken from the Internet at: http://www.computer.org/students/looking/summer97/ieee802.htm, date unknown, 5 pgs.

"Power-Saving Mechanisms in Emerging Standards for Wireless LANs: The MAC Level Perspective", Hagen Woesner, Jean-Pierre Ebert, Morten Schläger and Adam Wolisz, IEEE Personal Communications, Jun. 1998, pp. 40-48.

"IEEE 802.11e Wireless LAN for Quality of Service", Stefan Mangold, Sunghyun Choi, Peter May, Ole Klein, Guido Hiertz and Lothar Stibor, date unknown, 8 pgs.

"IEEE802.11 Tutorial", Jim Zyren and Al Petrick, taken from the Internet at: http://www.ydi.com/deployinfo/wp-80211-tutorial.php?screen=print, date unknown, 7 pgs.

* cited by examiner

INTER-FRAME SPACES FOR 802.11$_B$ DSSS (µs)

| SLOT TIME | SIFS TIME | PIFS TIME | DIFS TIME |
|---|---|---|---|
| 20 | 10 | 30 | 50 |

FRAME BODY OF ACTION FRAME

| FIELD NAME | CATEGORY CODE | ACTION CODE | ACTIVATION DELAY | DIALOG TOKEN | ACTION BODY |
|---|---|---|---|---|---|
| BYTES | 1 | 1 | 1 | 1 | 0-2300 |

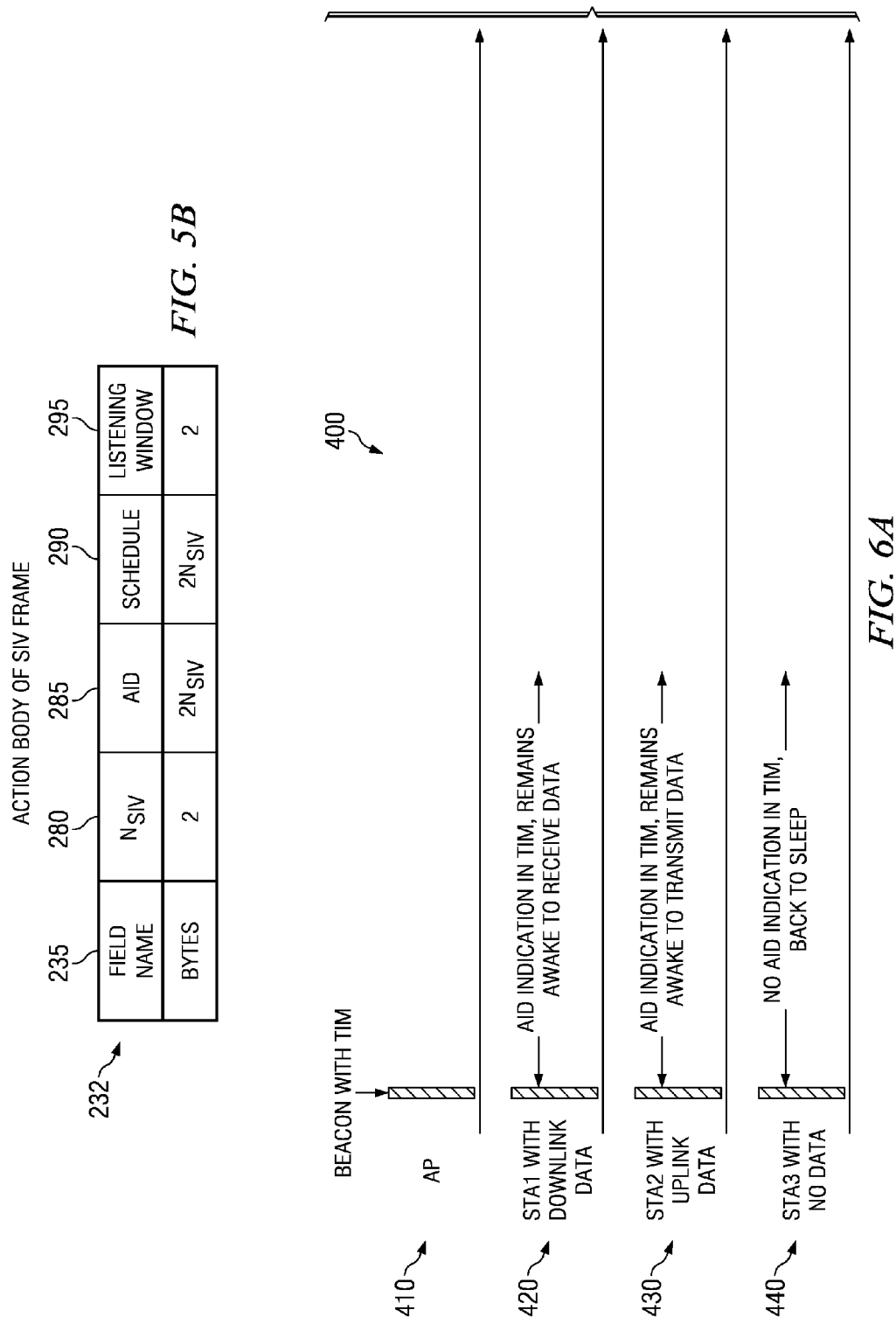

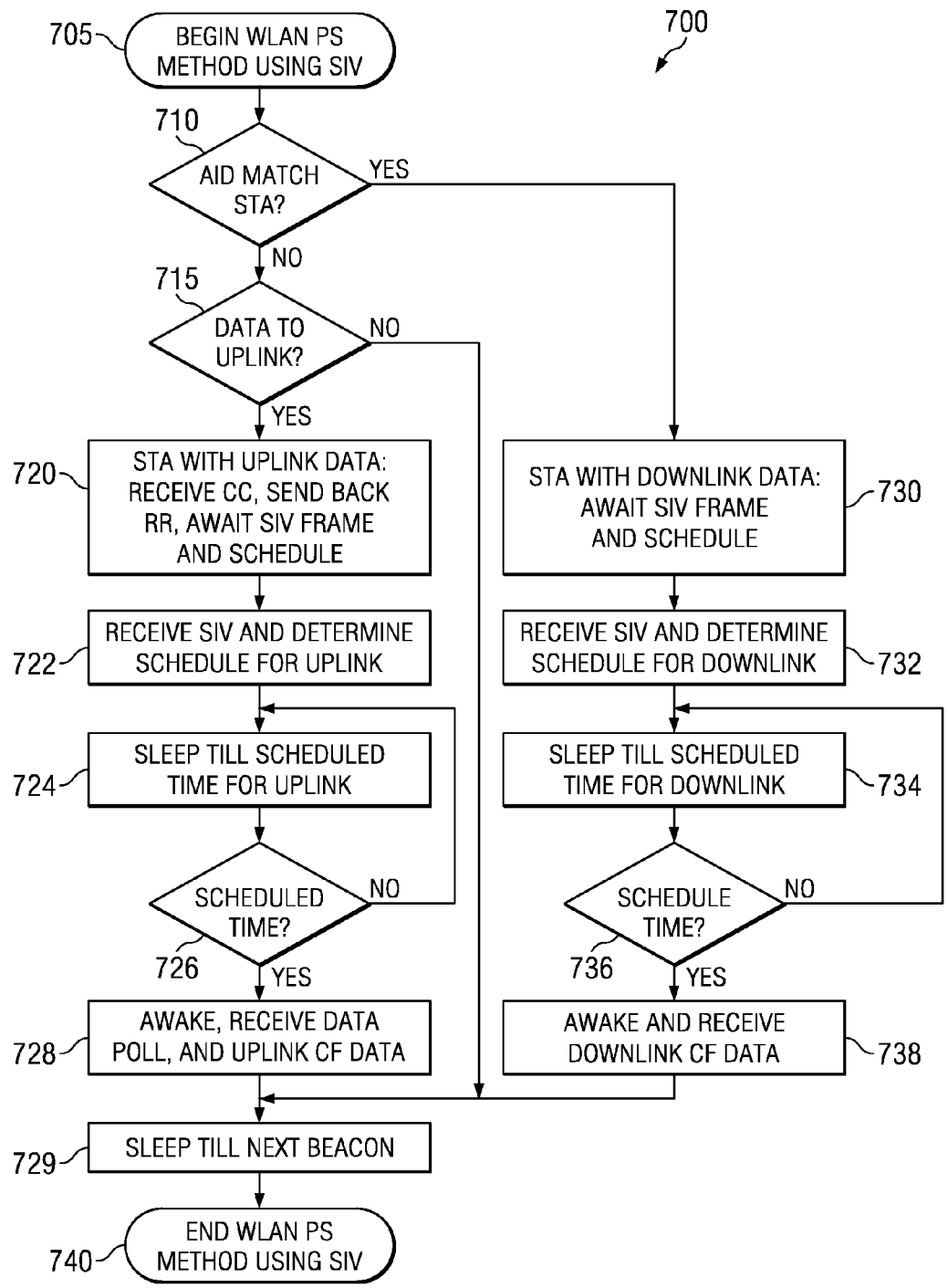

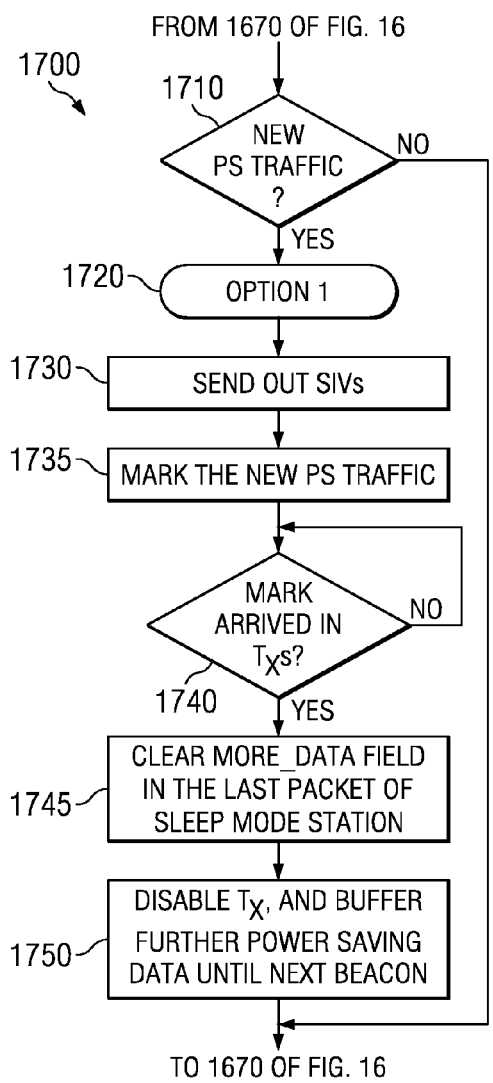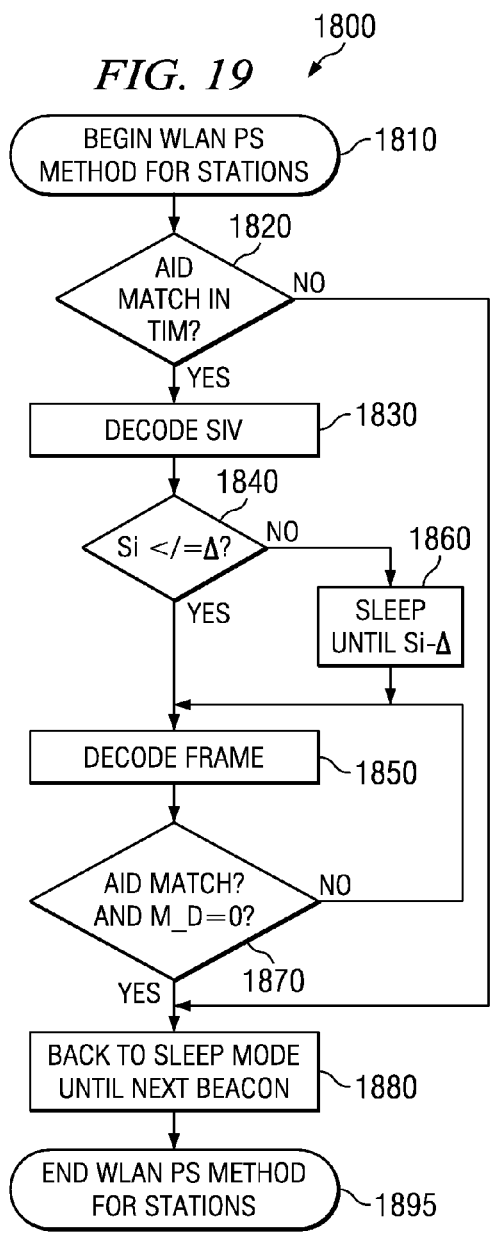

SYSTEM AND METHOD FOR PRIORITIZING DATA TRANSMISSION AND TRANSMITTING SCHEDULED WAKE-UP TIMES TO NETWORK STATIONS BASED ON DOWNLINK TRANSMISSION DURATION

FIELD OF INVENTION

The present invention relates generally to wireless networks and more particularly to systems and methods for saving power in wireless local area networks.

BACKGROUND OF THE INVENTION

The Institute of Electrical and Electronics Engineers (IEEE) has produced a series of standards referred to as 802.X, which encompasses LANs (Local Area Networks), MANs (Metropolitan Area Networks) and PANs (Personal Area Networks) such as Bluetooth. The IEEE 802 is confined to standardizing processes and procedures that take place in the bottom two layers of the OSI (Open System Interconnection) reference model—the media access control (MAC) sublayer of the link layer and the physical layer.

The original standard that is currently used to establish a wireless local area network (WLAN) is the IEEE 802.11 standard. The IEEE 802.11 standard was published first in 1997 and it was designed to provide data rates up to 2 Mbps (such as a DSL connection) at 2.4 Ghz. The standard includes specifications for Media Access Control (MAC) and physical layer operation. The physical layer standard was designed to use either frequency hopping spread spectrum (FHSS) or direct sequence spread spectrum (DSSS). In 1999, 802.11a and 802.11b provided enhancements at the physical layer with higher data rate support up to 54 Mbps in the 5 GHz band and 11 Mbps in the 2.4 GHz band, respectively.

The newly developed 802.11e standard is working to enhance the current 802.11 MAC to expand support for applications with high QoS (Quality Of Service) requirements. Wireless networks fit both business and home environments, that both require the support of multimedia, and the 802.11e standard provides the solution for this need. In both wired and wireless networks, data transmission is susceptible to interruptions caused when packets are present or lost during the transmission process. These interruptions can cause problems for data to be streamed in a contiguous fashion. The 802.11e has created a QoS baseline document that proposes methods for handling time-sensitive traffic.

In the WLAN topology, each wireless network requires a radio transceiver and antenna. Components on the wireless network are either stations (STAs) or access points (APs). Typically, a station STA is mobile or portable, and the access point AP may be a permanent structure analogous to a base station tower used in cellular phone networks or to a hub used in a wired network. A basic service set (BSS) is formed when two or more stations have recognized each other and established a network. An extended service set (ESS) is formed when BSSs (each one comprising an AP) are connected together.

A standard WLAN according to 802.11 operates in one of two modes—ad-hoc (peer-to-peer) or infrastructure mode. The ad-hoc mode is defined as Independent BSS (IBSS), and the infrastructure mode as a BSS. WLANs may also be classified as distributed (ad-hoc), or as centralized systems (infrastructure based system).

In ad-hoc mode (IBSS), each client communicates directly with the other clients within the network on a peer-to-peer level sharing a given cell coverage area. This mode was designed such that only the clients within transmission range of each other can communicate. If a client in an ad-hoc network wishes to communicate outside of the range, one of the clients (members) must operate as a gateway and perform routing.

FIG. 1 illustrates the basic service set BSS 1 operating in the infrastructure mode, wherein a wireless network is formed between one or more stations (STA) 2 communicating with an access point (AP) 4 such as a communications tower. The access point acts as an Ethernet bridge and forwards the communications onto the network (e.g., either wired or wireless network). Several such BSS networks communicating together over the infrastructure between APs further form an Extended Service Set (ESS), or a Distribution System (DS).

Before stations and access points can exchange data, they must establish a relationship, or an association. Only if an association is established can the STA and AP exchange data. The association process involves three states:
Unauthenticated and unassociated
Authenticated and unassociated
Authenticated and associated In the transition between the states, the communicating parties exchange messages called management frames. The APs are designed to transmit a beacon management frame at fixed intervals. To associate with an access point and join the BSS, a station listens for beacon messages to identify the access points within the range. After the station receives a beacon frame (message) it selects the BSS to join. The network names, or service set identifiers (SSID) contained in the beacon frame, permit the user to choose the SSID the user wishes to join. A station can also send a probe request frame to find the associated access point with the desired SSID. After the station identifies the access point, they perform an authentication by exchanging several management frames.

As illustrated in prior art FIG. 2, a wireless transceiver 20, according to the OSI (Open System Interconnection) reference model, comprises in part, a series of protocol layers 23 having a physical layer PHY 24, a data link layer 26, and a NETWORK layer 28. The data link layer 26 further comprises a medium access control MAC 26a sublayer and a logical link control LLC 26b sublayer. The OSI reference model describes networking as a series of protocol layers with a specific set of functions allocated to each layer. Each layer offers specific services to higher layers while shielding these layers from the details of how the services are implemented. A well-defined interface between each pair of adjacent layers defines the services offered by the lower layer to the higher one and how those services are accessed.

The physical layer PHY 24 is involved in the reception and transmission of the unstructured raw bit stream over a physical medium. It describes the electrical/optical, mechanical, and functional interfaces to the physical medium. The PHY 24 layer carries the signals for all the higher layers. The MAC 26a sublayer of the data link layer 26, manages access to the network media, checks frame errors, and manages address recognition of received frames.

The LLC 26b sublayer establishes and terminates logical links, controls frame flow, sequences frames, acknowledges frames, and retransmits unacknowledged frames. The LLC 26b sublayer uses frame acknowledgement and retransmission to provide virtually error-free transmission over the link to the layers above. The NETWORK layer 28 controls the operation of the subnet. It determines the physical path the data should take, based on network conditions, priority of service, and other factors, including routing, traffic control, frame fragmentation and reassembly, logical-to-physical address mapping, and usage accounting.

Wireless transceiver 20 also illustrates a packet of data 30 which may be transmitted or received via the NETWORK layer 28 and other higher level layers of the transceiver 20.

Wireless Local Area Networks (WLAN) are gaining increasing popularity today by establishing anywhere and anytime connections. According to recent predictions, the market of WLAN adapters will reach 35 million units in 2005. However, a larger market for WLAN lies in the mobile device world such as cellular phones and PDAs, whose market is projected to reach 500 million units in 2005.

As more WLAN chips are embedded into battery powered mobile devices, power consumption inevitably becomes a bottleneck to its wide deployment. The average power consumption for a typical WLAN adaptor, employing the power saving technique specified in the IEEE 802.11 standard, is significantly higher than a normal cellular phone. This further implies that a cellular phone with current battery capacity will be drained in substantially less time if a WLAN chip is embedded.

Recent advancements in circuit design have reduced the power consumption of WLAN chips dramatically in sleep mode. For example, the power consumption in deep sleep state is only 2 mw in the Texas Instruments TNETW1100B series chips. However this reduction alone is not able to alleviate the problem to the same degree in current wireless LANs, as the power reduction in the deep sleep mode cannot be fully utilized.

The impeding force is the broadcast based wireless MAC protocol. To receive a frame addressed to itself, a station has to continuously monitor the wireless channel and decode every frame for the MAC address to be checked against its own. Compared with the stations transmission or reception of data, this contending procedure commonly dominates the activity of a wireless station and prevents the station from sleeping. Consequently, power consumption during contention is a major contribution to battery drain.

Recent research proposes exploiting the low power consumption available during sleep mode. Allowing a station to wake up only periodically, often at several beacon intervals, this approach requires the AP to buffer power saving traffic and deliver it according to the station's pre-negotiated listening interval.

Although such an approach reduces the power consumption significantly, it does not fully address the problem. For example, all portable devices can benefit from power savings. With the increasing amount of power saving traffic, a station waking up at a certain beacon will likely face fierce competition retrieving or receiving data from the AP, and once again, waste significant power during contention. Further, power saving traffic may be associated with additional QoS and non-QoS constraints. For example, a voice traffic stream has a stringent delay requirement, but relatively low and periodic bandwidth consumption. However, the delay requirement will preclude the station from entering sleep mode according to the protocol given above, as frequently a beacon interval is about 100 ms. In addition, the situation is exacerbated by the increasing set of QoS applications incorporating WiFi networks. Further, powering on and off different modules in WLAN devices may incur additional power consumption and delays, if power savings techniques are not carefully applied.

Accordingly, there is a need for an improved protocol to address the problems associated with QoS as well as non-QoS traffic flows and minimizing total power consumption across all the power saving stations, while ensuring scalability during increased power saving traffic on a wireless local area network.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention relates to a new system and method implemented in the MAC sublayer, utilizing an optimal scheduler based on a transmission time calculation and prioritizing algorithm, used in association with a Schedule Information Vector (SIV) protocol for saving power in wireless local area networks. The system and method of the present invention generally targets best effort power saving (PS) traffic utilizing the SIV protocol. In addition, although non-QoS PS traffic is the focus of this invention, several aspects of the invention facilitate both QoS and non-QoS power save traffic.

The power saving system utilizing the SIV protocol comprises an access point having a priority queue and an algorithm for calculating the transmission time (T) of downlink data to one or more stations, and an SIV frame. The SIV frame comprises one or more association IDs for identifying stations and corresponding schedules of wake-up times for the identified stations. The current data to be transmitted (e.g., $T_x$, downlinked) to each station is accessed by the algorithm, wherein the total transmission time T to each station is calculated. A priority queue (e.g., a temporary holding place for data) in the access point then, arranges the order of the transmissions to each station, by first transmitting data with the shortest time consumption followed by those with longer time consumption to minimize the total power consumption of the network.

The access point originates and transmits the SIV frame of the scheduled wake-up times to the stations. When an identified station awakes at the scheduled time, the AP directs the station to uplink or downlink data according to another suitable protocol, for example, the contention free protocol as specified by 802.11e. For example, the AP may, according to one aspect of the invention, direct the identified station to receive a poll for uplink CF transmission, or to receive downlink CF data, thereby minimizing time the station must remain awake, thus saving power by minimizing time in channel contention. By enabling all the data transmission to be scheduled under the same optimized scheduler, the SIV protocol in association with the present invention provides a flexible way to address power saving and non-power saving data as well as QoS and non-QoS data traffic.

In order to maximize the sleep time of a power saving station, power saving data is first buffered at the AP and the corresponding SIV frame(s) are sent out only periodically, for example every beacon interval (approximately several hundred milli-seconds). In response, the inventor has designed the hierarchical scheduling algorithm to be operable to aggregate all the data to a specific power saving station and order the transmissions to different stations based on the calculated transmission time. The spacing of the data transmissions are also analyzed to determine whether a station will use less power by staying awake for the next downlink of data or going into sleep mode until the data is to be received.

Still another aspect of the invention provides a method of saving power in a wireless network comprising an access point, one or more stations, an SIV frame, and an algorithm for calculating a transmission time T of downlink data for the stations. The method comprises calculating the transmission time of data to be downlinked to the stations using the algorithm, determining a priority queue ordering of the transmissions based on the time calculated for each station, scheduling an awakening time in the SIV frame for each PS station based on the transmission order. The method may then continue in accordance with the SIV protocol sending and receiving data.

In another aspect of the present invention, the AP scans the traffic streams of the PS stations, sets up the TIM field in the beacon, then calculates the total transmission time T of data to downlink to each station using the transmission time algorithm. A priority Queue in the AP then arranges the order of the transmission times T such that $T_1 < T_2 < \ldots T_i \ldots < T_N$ where i is the number of stations, and N is the number of backlogged stations. The AP then sets-up the SIV schedule fields according to $[0, T_1, T_2, \ldots T_i, \ldots T_{N-1}]$ and the transmission data is transferred to the firmware in the order 1, 2, 3 ... i ... N.

If new power saving traffic is received before the current PS transmissions are completed, the power saving method further comprises continuing to send out the old power saving data in accordance with the current SIV frame. New packets are marked in order to be distinguished from old ones. Upon emptying the buffer for the particular station or reaching marked traffic, the method then clears the "MORE_DATA" field in the last unmarked packet for the sleep mode station, disables the transmission (Tx), and buffers further power saving frames until the next beacon.

A PS station will periodically awaken according to the pre-specified beacon interval. In still another aspect of the present invention, when the PS station has detected an AID match in the TIM, the station decodes the SIV frame following the beacon. According to the time remaining until the scheduled wake-up time $S_i$, decoded in the SIV frame, the PS station will determine whether the station will remain awake for the next downlink of data or go into sleep mode until the data is to be received. When the data frame has arrived on the wireless channel and is decoded with the AID match and the MORE_DATA bit set to zero, the station will go back into sleep mode until the arrival of the next beacon.

To the accomplishment of the foregoing and related ends, the following description and annexed drawings set forth in detail certain illustrative aspects and implementations of the invention. These are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 5B is a diagram illustrating an exemplary format of the frame body of an action frame for the SIV frame used in association with the present invention;

FIGS. 6A-6D are timing diagrams illustrating several stations' successive responses to various AID indications in the TIM of a beacon and schedules in an SIV frame used in association with the present invention;

FIG. 7 is a flow chart diagram illustrating the operation of the SIV protocol used in saving power in a wireless network used in association with the present invention;

FIGS. 15-19 are flow charts illustrating various method aspects of saving power in a wireless network using an SIV protocol and a transmission time calculation algorithm in accordance with the power saving system of FIG. 11, and various aspects of the present invention.

DETAILED DESCRIPTION OF THE INVENTION

Figure 1:
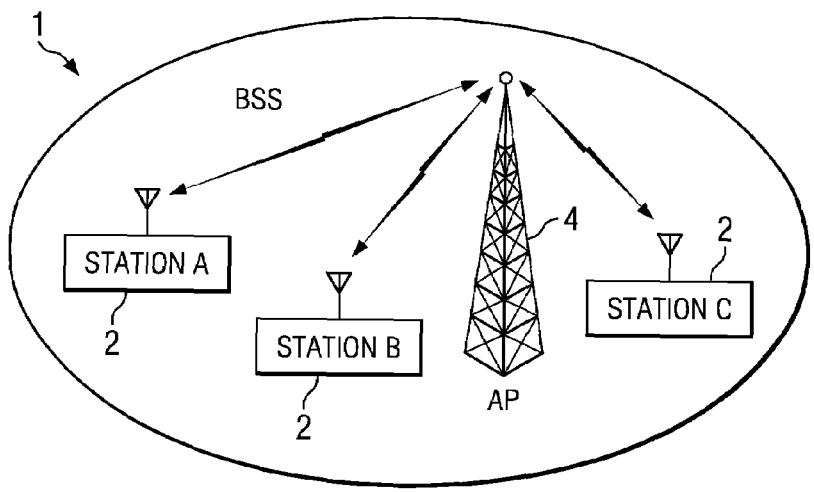
FIG. 1 is a prior art diagram illustrating a basic service set BSS of a wireless network operating in the infrastructure mode.
Figure 2:
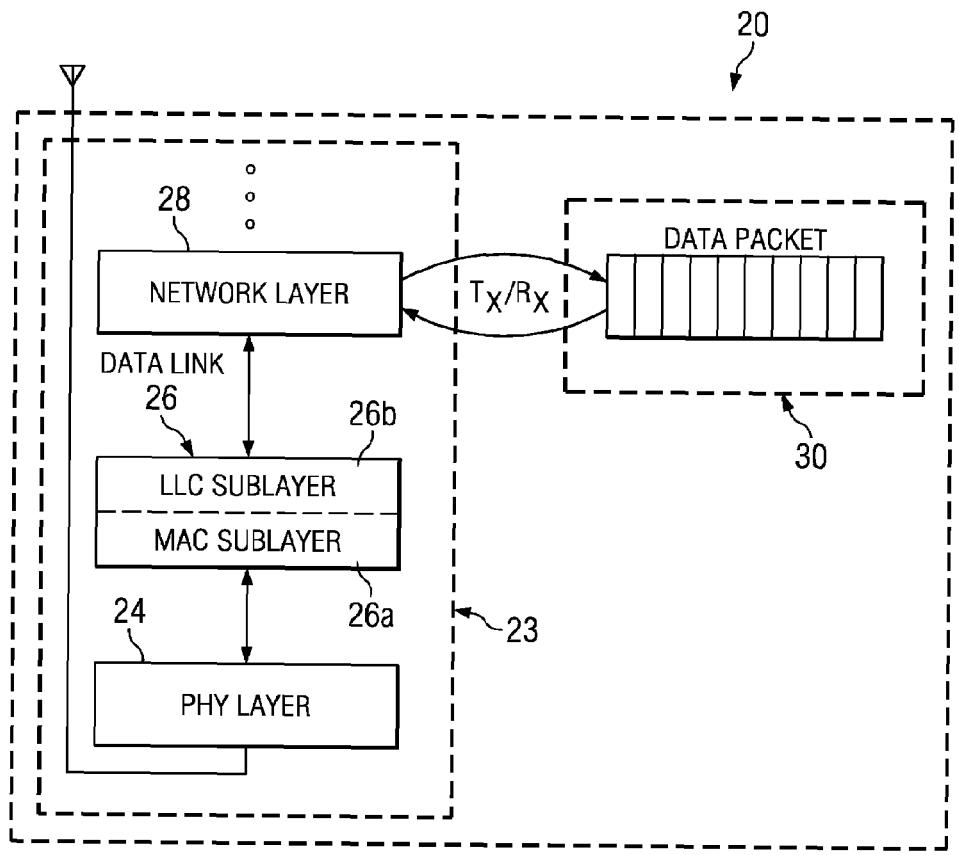
FIG. 2 is a prior art diagram of a wireless transceiver, according to the OSI reference model illustrating a series of protocol layers and a data packet to be transmitted or received.

The present invention will now be described with reference to the attached drawings, wherein like reference numerals are used to refer to like elements throughout. The invention relates to a hierarchical scheduling architecture as a power savings mechanism in a wireless network in which a transmission time calculation and prioritization algorithm is utilized in association with a schedule information vector SIV frame and protocol. In order to better appreciate one or more features of the invention, several exemplary implementations of the power saving system, the associated SIV frame, timing diagrams for the same, and a power saving method is hereinafter illustrated and described with respect to the following figures.

The inventive aspects of the SIV protocol and associated FIGS. 3-7 will be initially presented, followed by those of the optimal scheduler based on the transmission time calculation and transmission prioritizing algorithm of the present invention and FIGS. 8-16.

Figures 3, 4, 5A:
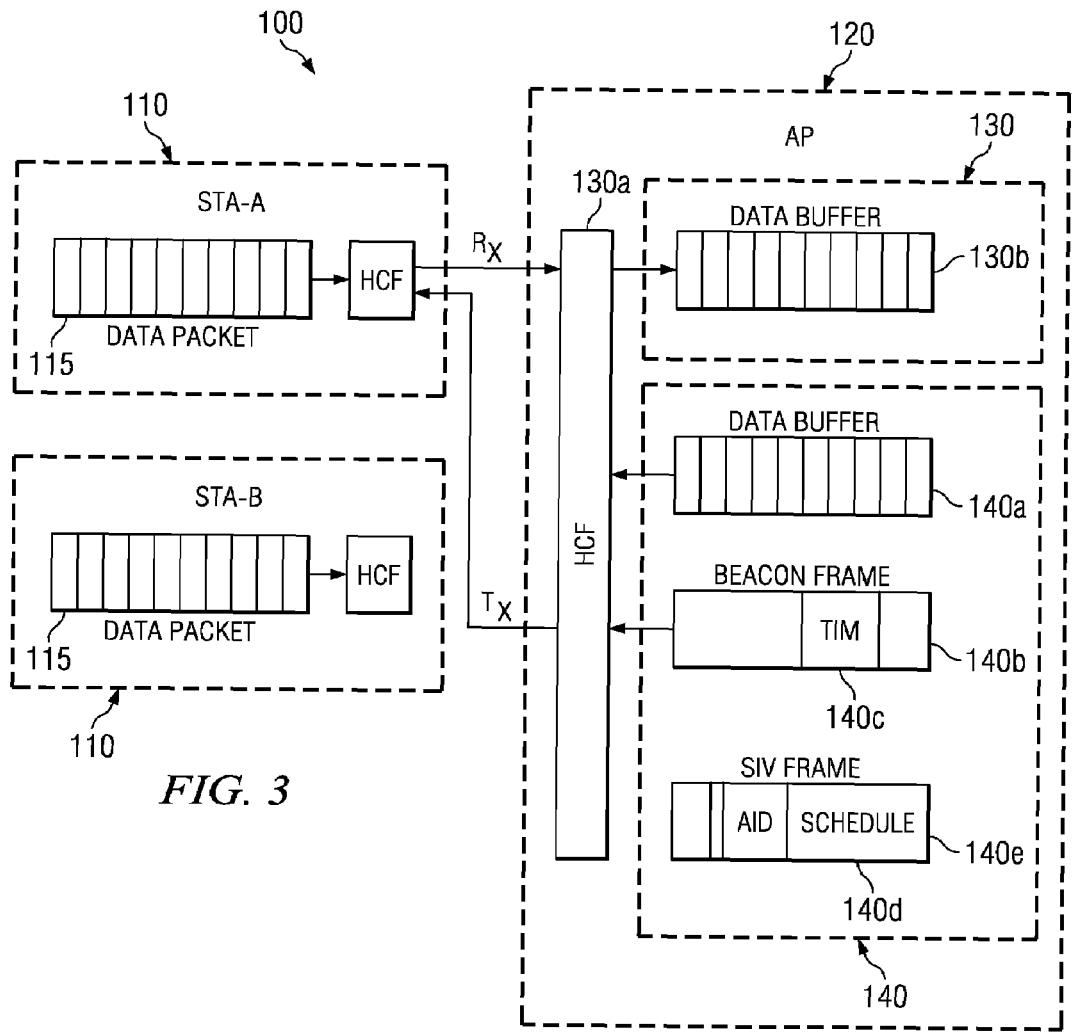
FIG. 3 is a simplified diagram of an exemplary data packet exchange between a station and an access point during an uplink or a downlink.
FIG. 4 is a diagram illustrating exemplary timing relationships used in Inter-Frame Spaces according to IEEE 802.11b using DSSS.
FIG. 5A is a diagram illustrating an exemplary action frame body according to IEEE 802.11e for the SIV frame used in association with the present invention.

FIG. 3 illustrates a simplified diagram of an exemplary wireless network 100 utilizing the SIV protocol used in association with the present invention during a data packet exchange via an uplink or a downlink. The exemplary wireless network 100, comprises one or more stations STA-A and STA-B 110, that may either uplink a data packet 115 (e.g., of power saving data) transmitted to an access point AP 120, or receive the data packet 115 in a downlink transmission from the AP 120. The AP 120 may further comprise a transceiver having a receiver section $R_x$ 130 and a transmitter section $T_x$ 140.

Data received, for example, according to the hybrid coordination function HCF 130a, is put in data buffer 130b in the $R_x$ 130 section to be extracted and placed on the network infrastructure associated with the AP 120. Data to be transmitted, for example, from the $T_x$ 140 section is assembled in DATA BUFFER 140a after transmission of a beacon frame 140b, comprising a traffic indication map TIM 140c having association IDs (AIDs), and a schedule information vector frame SIV 140e having scheduling information 140d. To save power, before data is transmitted or received in the exemplary network 100, the SIV protocol provides a scheduled time for stations STA-A and STA-B 110 to awake and begin the uplink or downlink with the AP 120 of the associated network infrastructure. Awaking at a scheduled time, according to the SIV 140e protocol, minimizes time and power that, for example, STA-A 110 may otherwise waste contending for the channel with another such station STA-B 110 within the network 100.

For example, the SIV frame protocol of the wireless network may provide a scheduled wake-up time for STA-A 110, which is offset by 2 ms from the wake-up time of STA-B 110 that is also offset by 2 ms from the wake-up time of another such station (not shown), to minimize any channel contention between the stations and the AP 120. The inventors of the present invention have found that minimizing channel contention time is a significant factor in wireless network power savings.

The SIV frame protocol of the wireless network may be dynamically adjusted to provide the scheduled wake-up times of the stations, a sequence of the wake-up times, a periodic wake-up time, a plurality of wake-up times, and a duration of the wake-up times of the stations. These dynamic adjustments may be made based on one or a combination of network traffic, traffic buffering times, data priorities, data length, and data rates.

Thus, the inventors herein have realized that the Schedule Information Vector SIV protocol may be utilized in association with the present invention of the hierarchical scheduling algorithm. The SIV pre-schedules power saving traffic and announces the scheduled transmission time to each power saving station. Therefore, after collecting the schedule information, a station can remain asleep and wake up only at the designated (scheduled) time or multiple scheduled times. The protocol is facilitated by the newly specified 802.11e Hybrid Coordination Function (HCF), which incorporates the previous Distributed Coordination Function DCF, the enhanced DCF (EDCF), and the point coordination function PCF. By employing HCF, for example, the AP can obtain access to the wireless channel as needed and is thus capable of transmitting the power saving traffic according to the schedule. Although the SIV concept utilized in the present invention is discussed in conjunction with the above standards, it should be understood that incorporation may occur in other protocols and such alternatives are contemplated as falling within the scope of the present invention.

Although power reduction by employing SIV is significant, the advantage of SIV extends beyond this. By scheduling the transmissions of the stations at different times, the SIV protocol has the potential to transform the contention based 802.11 MAC into a TDMA (time division multiple access) based protocol, which generally has higher throughput and lower power consumption. In addition, full backward compatibility is maintained, which means that legacy stations can still use the contention based access mechanism to gain control of the channel.

The 802.11e Hybrid Coordination Function

The SIV protocol, utilized in the present invention, is an enhancement to the recently specified 802.11e MAC.

The Hybrid Coordination Function (HCF) was proposed by the 802.11e group to provide QoS enhancements to the current 802.11 MAC. HCF uses a contention-based channel access method, called the Enhanced Distributed Coordination Function (EDCF) concurrently with a polling based, contention free (CF) channel access mechanism. Contention based and contention free channel access methods can be alternated freely by the AP. A station (STA), or an access point (AP), may obtain transmission opportunities (TXOP) at a period of time during which the channel is dedicated to the station, using either channel access mechanism.

The SIV protocol used in association with the present invention is substantially based on the contention free method. However, in order to clarify the alternation between contention-based and contention-free transmission essential to the backward compatibility, both are described in the following.

Contention Based Access

EDCF is an enhancement of the original DCF mechanism with the support of service differentiation among different traffic categories. EDCF maintains multiple queues corresponding to different traffic categories rather than a single queue in DCF. Each queue contends for the channel using the original MAC protocol, i.e., a "back-off" interval is generated for each queue and whenever it counts down to zero, a head-of-line packet (packet header) is transmitted.

Prioritized services are provided by assigning a different Arbitration Inter-Frame Space (AIFS) and an initial contention window size CWmin to traffic categories. Intuitively, lower CWmin leads to a shorter back-off interval thus higher chance of channel access. The AIFS denotes the period of channel idle before the back-off counter can decrease. During a period of congestion, a larger AIFS will decrease the channel access opportunity by preventing the back-off counter from decrementing.

If more than one queue reaches zero at the same time, the traffic category with the highest priority wins and transmits. Lower priority traffic categories assume a collision and increase their contention windows.

Contention Free Access

In contrast to EDCF, contention free access is based on a polling scheme controlled by a Hybrid Coordinator (HC) operating at the access point. HC gains control of the wireless medium as needed to send QoS traffic or to issue QoS (+)CF-Polls to stations. The higher priority of HC is obtained by waiting a shorter time between transmissions than the stations using EDCF or DCF access procedures. Specifically, HC can start transmitting when the channel is sensed to be idle for a PIFS (PCF Inter-Frame Space) time.

FIG. 4 summarizes an exemplary timing relationship diagram 200 of the different inter-frame spaces for 802.11b DSSS expressed in microseconds. The times shown for Inter-Frame spaces for 802.11b DSSS, represent exemplary values that may be used in the context of the present invention.

Contention based and contention free transmission can be flexibly alternated by the HC, i.e., the channel is open for contention if it has been idle for a DIFS time.

Power Saving Mechanism Under HCF

The power saving mechanism under HCF is termed Automatic Power Save Delivery (APSD). As in the 1997 802.11 standard, APSD allows a station to wake up from sleep state periodically to listen to the beacon, in which the AP indicates the presence of buffered traffic using the Traffic Indication Map (TIM) field. However, for a station who's ID is present in TIM, 802.11 defines different behavior from that of 802.11e. In 802.11, an identified station remains awake and sends PS-Polls to the AP to retrieve buffered traffic from the AP. By contrast, in 802.11e, an identified station simply remains awake and silently waits for the frames delivered by the AP. Under both standards, the station can go back to sleep if the AP sets the "more data" field in a data frame to zero.

The advantages of APSD over the PS mechanism in the 1997 standard are two-fold. First, a station no longer needs to transmit PS-Polls under APSD and hence the power for transmitting and contending the channel is eliminated. Secondly, the AP has full control of the delivery order of the frames buffered at the AP, which may pertain to different QoS classes.

However, APSD does not fully address the power saving problem, particularly considering QoS requirements. Under APSD, a station typically remains awake for the reception of data. During this waiting period, the station decodes all the data on the network and hence may consume unnecessary power on irrelevant data. The situation will deteriorate on a congested network or as a result of increased power saving traffic.

When QoS data is present with more stringent requirements than the power saving data, the AP will likely transmit the power saving data following the QoS data. Therefore, the waste of power will be exacerbated further as the percentage of QoS traffic increases on the wireless network.

Furthermore, APSD only allows a station to wake up once per beacon interval, which usually is about 100 ms. This essentially prohibits any QoS data with a delay requirement less than 100 ms from entering sleep mode. For example, a delay sensitive telnet application with bursty and sporadic traffic may waste considerable power forcing the WLAN chip to monitor the channel continuously. Therefore, APSD has not provided a flexible method to harmoniously address the requirements of both power saving and QoS.

The Schedule Information Vector

Given the limitation of the APSD on power saving, the Schedule Information Vector (SIV) is useful to reduce the high power consumption on contention while a station waits for its data.

The SIV schedules a station to wake up predominately at a designated time for the reception of downlink data or polls for uplink traffic. This is accomplished by broadcasting or unicasting schedule information to a particular station in the current BSS by the HC. Once a station receives its own schedule, it can enter sleep mode and only wake up at the specified time.

The SIV protocol is detailed in the following aspects: the design of a frame for delivering the schedule information, a detailed description of the behavior at the AP and stations, and a discussion of the exception handling when a schedule disturbance is encountered. Although the SIV frame is operable to deliver a broadcast schedule to multiple stations, it may further comprise a unicast schedule to a particular station.

The action frame in 802.11e is employed as the base frame type used in association with the present invention. The action frame is defined as a wildcard frame where customized functions can be incorporated. The frame inherits the same header format as that of the data frames and uses the frame body having various parameter values.

FIG. 5A illustrates the format of the frame body 230 of the action frame in 802.11e used in association with the SIV frame of FIG. 5B. FIG. 5B, for example, illustrates an exemplary Action Body 232 of an SIV frame, and the format of the SIV protocol. The Field Name 235 identifies the specific field within the frames of FIGS. 5A and 5B, together with a corresponding number of bytes used within each field.

Category Code 240, together with the Action Code 245, specifies the corresponding action of the receiver of the action frame.

Activation Delay 250 defines the maximum tolerated delay for the execution of the action frame.

Dialog Token 255 regulates the feedback method.

Action Body field 260 includes the parameters of the execution of the frame body 230.

In FIG. 5B, four fields are contained in the Action Body 232 of the SIV frame of the present example, namely $N_{SIV}$ 280, AIDs 285, Schedule 290, and Listening Window 295.

$N_{SIV}$ 280 denotes the number of stations scheduled in the current frame. More precisely, it denotes the number of AIDs contained in the AID field 285.

AID 285 numerates the Association IDs of the scheduled stations. An AID of zero represents another SIV frame or CC frame to be sent out by the AP. This enables the flexibility of the SIV protocol to recursively schedule a power saving station or collecting of uplink requests. For example, due to unexpected poor channel conditions, the original schedule for a power saving station may not be fulfilled. Under such circumstances, the AP can send out an SIV frame with a 0 AID to schedule the station to wake up for future schedule information.

Schedule 290 comprises the schedules corresponding to different stations in the order given in the AIDs field 285. Notice that the schedule is a relative time (e.g., a time offset), relative to the current SIV frame. For example, a schedule of 10 ms denotes that the station's traffic will be sent 10 ms after the transmission of the current SIV frame. By choosing a relative schedule time instead of an absolute time, the synchronization requirement can be dramatically relaxed.

Listening Window 295, denotes the time period, following the scheduled time, during which the AP should send out the traffic. Due to possible channel variations and bursty traffic, an absolute guarantee of a transmission time on the shared wireless channel is unrealistic. The Listening Window 295 enhances the flexibility of scheduling, for example, in the presence of higher priority data.

The Behavior of the AP and Stations Using the SIV Protocol

Downlink power saving data is first buffered at the AP with its presence indicated at each beacon transmission via the TIM field. In the aforementioned, the presence of uplink power saving data at a station may be collected, for example, via the CC/RR protocol. As discussed in association with FIG. 3, the presence of power saving data may indicate either data to be downlinked ($T_x$) from the AP to an AID indicated station STA, or uplinked ($R_x$) to the AP from the AID indicated STA.

Following the beacon frame, the AP will schedule the power saving traffic, subject to the QoS requirements and the presence of non-power-saving data. Once the schedule is determined, the AP will transmit the SIV frame. At the pre-scheduled time, the AP will transmit the power saving data to the corresponding AID indicated station, subject to the requirement of the listening window 295 of FIG. 5B. If a scheduling decision could not be immediately reached, the AP may simply announce the transmission time for another SIV frame 300 of FIG. 5C and announce the schedule for power saving data using the scheduled SIV frame at a later time.

A power saving station needs to wake up periodically for the beacon and SIV frames. If a station finds its AID present in the AID field of the SIV frame, it continues parsing the Schedule field (e.g., 290 of FIG. 5B, 380 of FIG. 5C). Based on the scheduled time presented therein, the station decides whether to go back to sleep or continue listening, based on the length of the schedule. A short schedule denotes that the transmission of a stations' own power saving data will follow the SIV frame shortly. Entering and leaving sleep state in such a short period of time may incur additional power consumption powering up and down different modules, thus there may be no net power savings benefit entering the sleep state for a period less than some minimum.

If the station enters sleep mode, at the later specified time, the station needs to wake up early enough to guarantee the reception of the frames delivered from the AP. Once the exchanges sequence is over, indicated by a cleared "more data" field sent by the AP for downlink data or by the station for uplink data, the station can reenter sleep mode and prepare for awaking at the next beacon. Thus in one example, each station may receive a new schedule via another SIV following the next beacon.

For example, FIGS. 6A-6D illustrate timing diagrams of several successive station responses to various AID indications in the TIM of a beacon from an AP, employing the SIV protocol. In each of the FIGS. 6A-6D, timing response 410 illustrates what the AP is transmitting and receiving, while timing response 420 illustrates the response to a first station STA1 with downlink data to receive from the AP. Timing response 430 illustrates the response to a second station STA2 with uplink data to transmit to the AP, while response 440 illustrates the response to a third station STA3, with no data to transmit or receive.

In FIG. 6A, timing diagram 400 illustrates transmission of the beacon from the AP. The beacon includes the TIM comprising the AID and SIV frame protocol. In response 420, STA1 finds its AID is indicated in the TIM to receive data from the AP, so STA1 remains awake to receive the downlink CF data. In response 430, STA2 also finds itself buffering data to be transmitted to the AP, so STA2 also remains awake to send a request for uplink data and to receive a poll for the uplink CF transmission. In response 440, STA3 does not find its AID indication in the TIM or any data to be transmitted to the AP, so STA3 is allowed to go back to sleep mode till the next beacon.

Figure 6B:
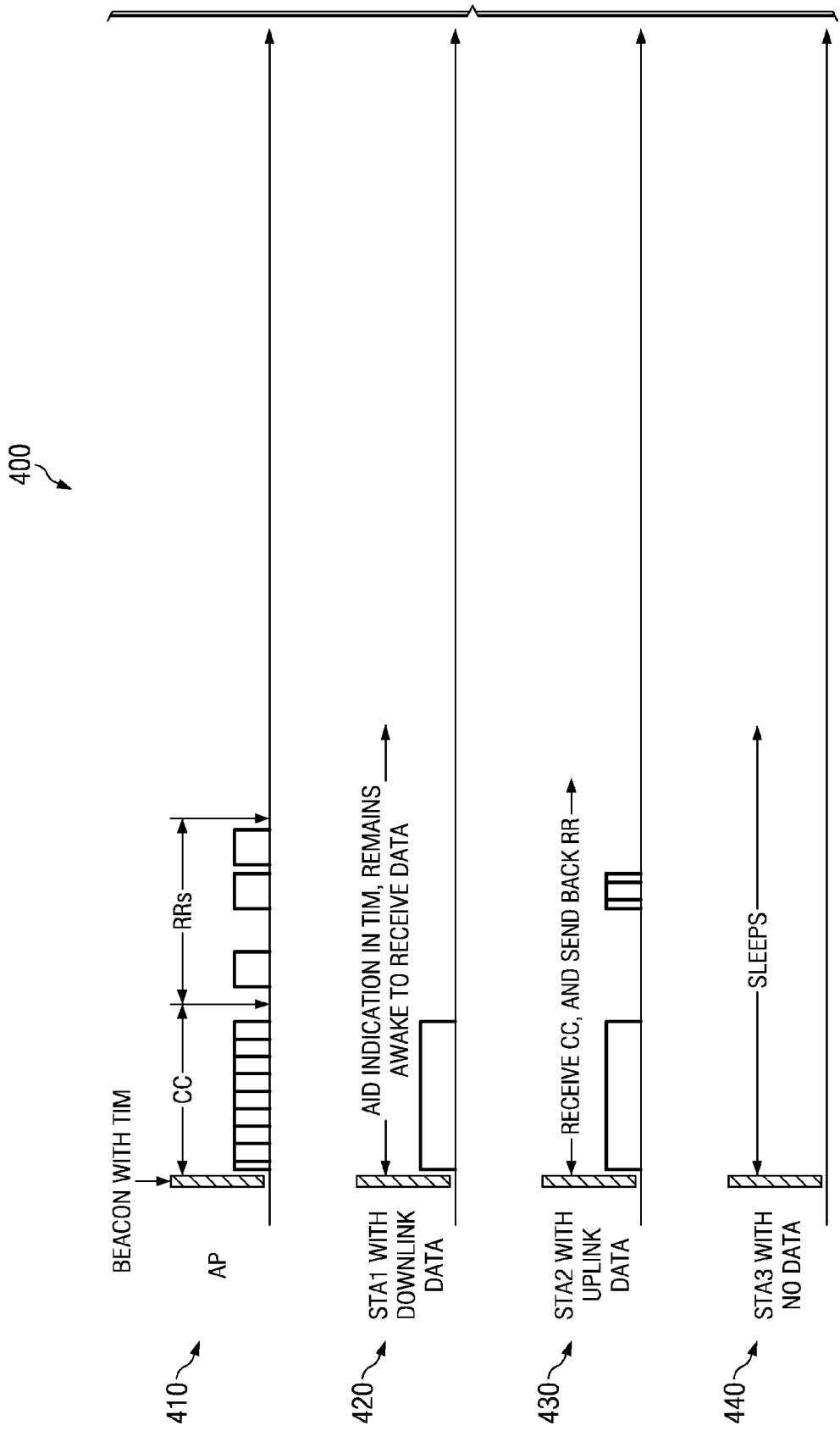

In FIG. 6B the exchange sequence begins between the AP and STA1 and STA2 to downlink and uplink data respectively. In 410, the AP sends out first a frame to collect uplink requests from different station, for example a CC frame. In response 420, STA1 simply remains awake awaiting the SIV frame for the scheduled time for the downlink CF data. In response 430, STA2 sends a request for the uplink data, for example by sending an RR frame. The AP collects received RRs and determines their respective schedule in conjunction with buffered downlink data, e.g, to STA 1.

Figure 6C:
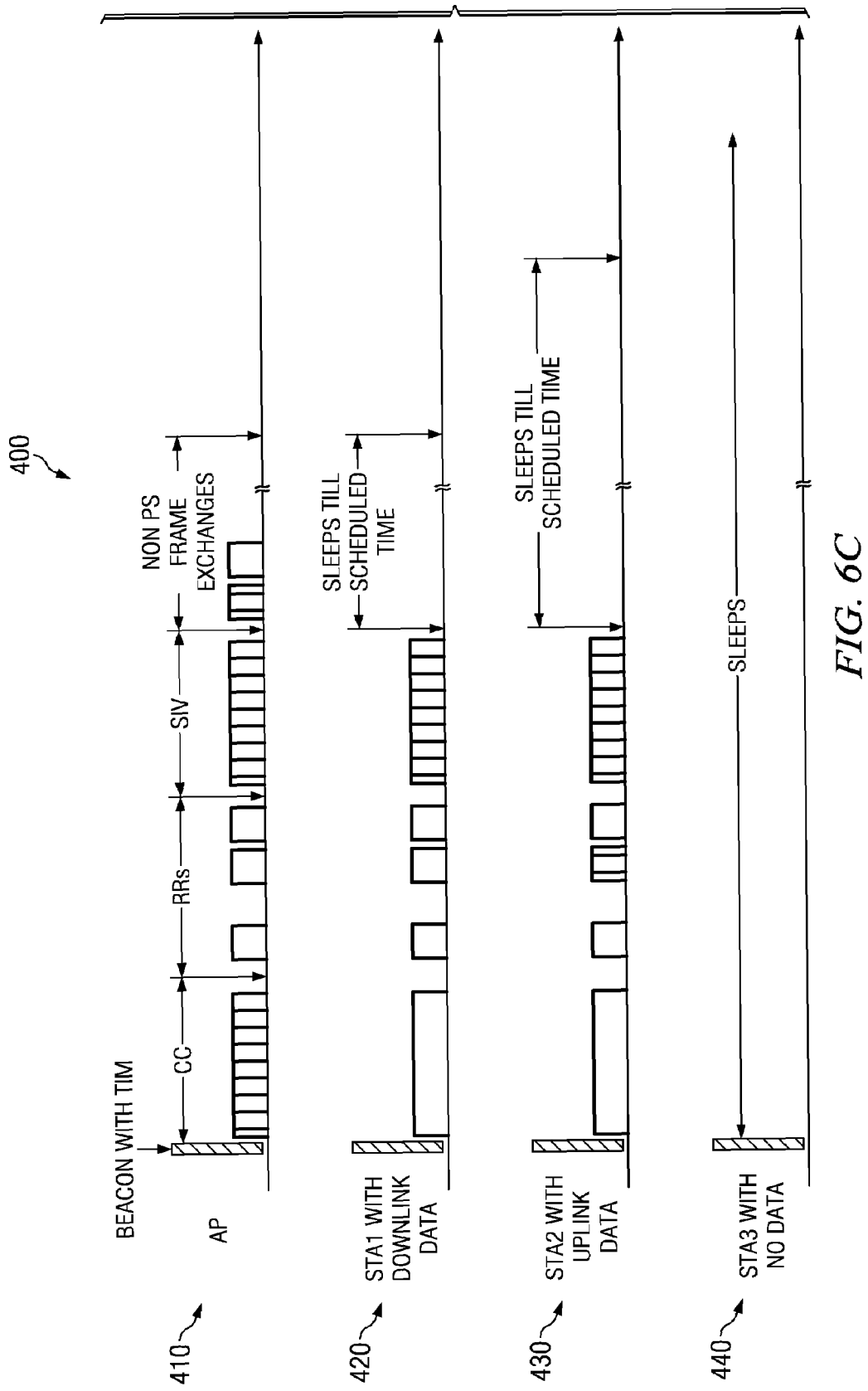

In FIG. 6C of timing diagram 400, the exchange sequence between the AP and STA1 and STA2 completes when the SIV frame has been received and the power savings schedules are determined. In response 420, STA1 determines from its schedule that it may enter sleep mode until a scheduled time to downlink data. In response 430, STA2 determines from its schedule that it may also enter sleep mode until a different (e.g., later time than STA1) scheduled time to uplink data.

Meanwhile, the AP, in response 410 is shown to be busy processing non power savings frame exchanges (e.g., with other stations, not shown).

Figure 6D:
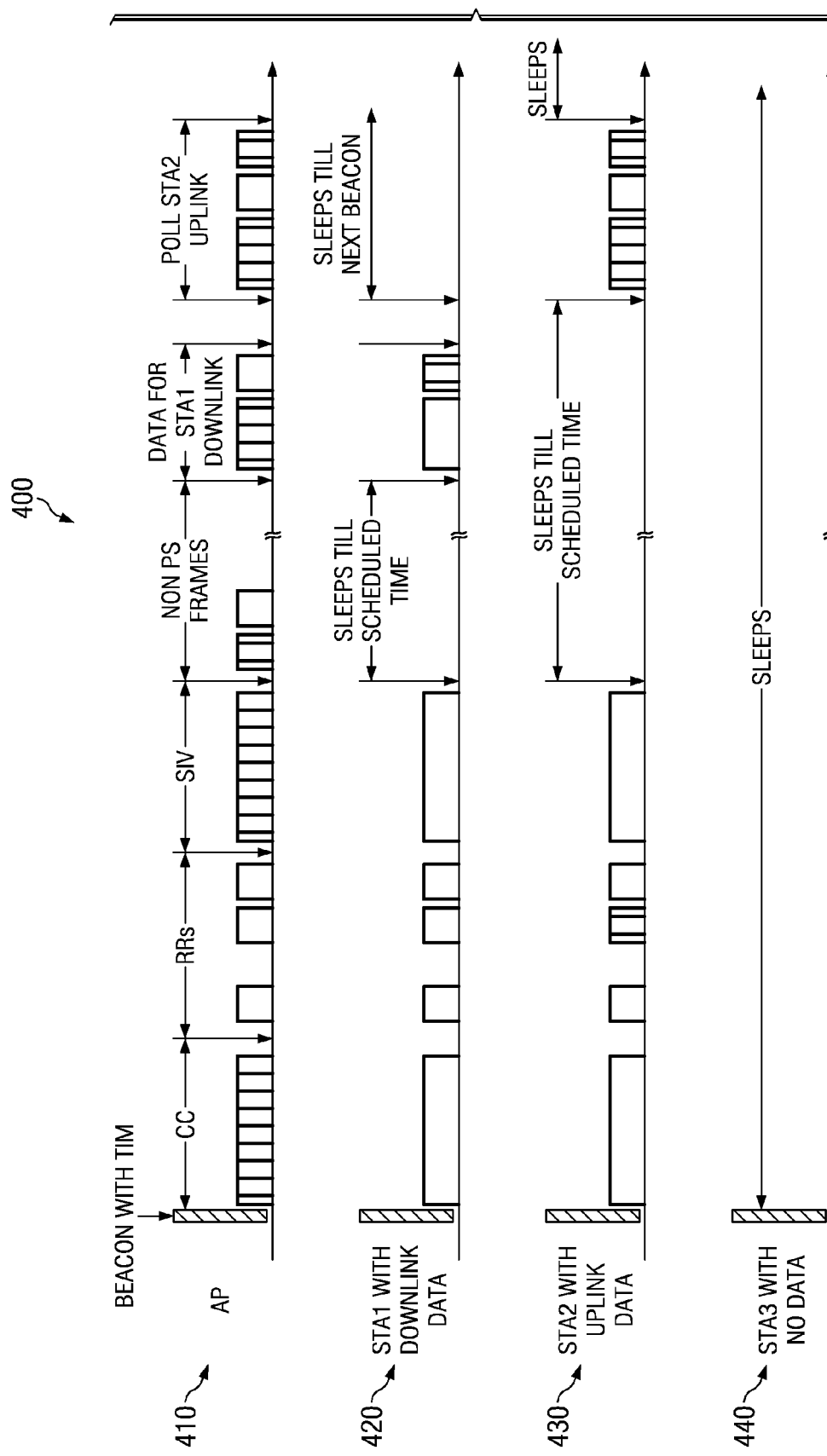

Finally, in FIG. 6D of timing diagram 400, the scheduled times begin arriving for STA1 and STA2 to awake from sleep mode. For example, response 410 and 420 show that STA1 has awaken at the scheduled time to receive the downlink CF data from the AP, while response 430 shows that STA2 still sleeps. When STA1 has finished the CF data downlink, STA1 is permitted to reenter sleep mode till the next beacon. Then, in response 430, STA2 awakes at its scheduled time to receive a poll from the AP. As further shown in the AP response 410, the AP polls STA2 at the scheduled time to initiate the uplink transmission from STA2. Thereafter, STA2 also joins STA1 and STA3 in sleep mode until the next beacon.

Therefore, the use of the SIV technique provides a wireless network power savings protocol that permits stations to remain in a sleep mode until a pre-scheduled time, avoiding contention for the channel and the power that would otherwise be wasted during such contention. As discussed above in connection with FIGS. 6A-6D, multiple transmissions within one beacon interval are also facilitated by the SIV protocol.

Handling Exceptions

Scheduling ahead on a wireless network is subject to disturbance from errors on the wireless medium and the arrival of higher priority data. As a result, the AP may not be able to fulfill the pre-schedule at the specified time.

In this and other such scenarios, there are two possible solutions. According to one approach, the protocol is configured to degrade to the APSD as specified in the standard. To be more specific, the AP will ignore the pre-schedule and perform scheduling appropriate to the new situation. In response to the absence of the scheduled transmission, the indicated station remains awake and continues monitoring the channel for reception of its data. In another approach, at the pre-scheduled time, the AP may send out a unicast SIV frame to the station with the altered scheduling information, wherein the station may adjust its expected time for data reception. Meanwhile, the station may reenter sleep mode for further power savings.

Thus, the wireless network power savings protocol also accommodates higher priority data while requiring no additional frame formatting.

A methodology for saving power in a wireless network that may be employed in association with the SIV frame protocol is illustrated and described herein, as well as wired networks and other types of networks.

Referring now to FIG. 7, an exemplary method 700 is illustrated for saving power in a wireless network comprising an access point AP, a station STA, and an SIV frame protocol. The method 700 comprises initially awaking the STA at a periodic time to monitor a beacon transmitted from the AP, and determining whether an association ID of the station is indicated within a TIM of the beacon. If the STAs association ID (AID) is not indicated and there is no uplink data to be transmitted, the STA returns to a sleep mode until a next beacon from the AP.

Method 700 also includes determining whether uplink data is to be transmitted from the STA to the AP. If the stations AID indicates uplink data is to be transmitted to the access point, the station remains awake, receives a CC from the AP and returns an RR back to the AP. When the SIV frame is received and a scheduled time for uplink is determined based on the SIV, the station is permitted to return to the sleep mode until the scheduled time for the uplink. The method then includes awaking at the scheduled time, sending a request for uplink CF data, receiving a poll for uplink CF data and transmitting uplink CF data to the AP.

Otherwise, if the stations' AID is indicated and downlink data is to be received from the AP, the station remains awake waiting for the SIV frame from the AP. When the SIV frame is received and a scheduled time for downlink is determined based on the SIV, the station is permitted to return to the sleep mode until the scheduled time for the downlink. The method then includes awaking at the scheduled time and receiving the downlink CF data, and returning to the sleep mode until the next beacon.

The exemplary power saving method 700 of FIG. 7, in accordance with the wireless network of FIG. 3, and the timing diagrams of FIGS. 6A-D, begins at 705. Initially the AP transmits a beacon having a traffic indication map TIM that includes an AID for identifying a station and an SIV frame and the SIV protocol. According to the protocol, the STAs awaken at a periodic time to monitor the beacon transmitted from the AP and SIV frame. At 710, a determination is made whether the AID of the station is indicated (a match) within the TIM of the beacon. If, at 710, the STAs AID is not indicated and no data to uplink to the AP, the STA returns to a sleep mode until a next beacon from the AP at 729.

Otherwise, if at 710, the STAs AID is not indicated but data is to be uplinked (transmitted) from the STA to the access point at 715, the station is directed to remain awake at 720, receive a CC from the AP and return an RR back to the AP, and awaits the SIV frame. The SIV frame is received at 722 and a scheduled time for uplink is determined based on the SIV. The station is then permitted to return to the sleep mode at 724 until the scheduled time for the uplink is determined at 726. The station then awakens at the scheduled time at 728, receives a poll for uplink CF data, and transmits uplink CF data to the AP, and returns to the sleep mode at 729 until the next beacon.

Otherwise, if the stations AID is indicated at 710 and downlink data is determined to be received at 715 from the AP, the station is directed at 730 to remain awake waiting for the SIV frame from the AP. The SIV frame is received at 732 and a scheduled time for downlink is determined based on the SIV. The station is then permitted to return to the sleep mode at 734 until the scheduled time for the downlink is determined at 736. The station then awakens at the scheduled time at 738 and receives the downlink CF data, and returns to the sleep mode at 729 until the next beacon.

Thereafter, the power savings method ends at 740, wherein one or more stations may uplink or downlink CF data with an access point of a wireless network. Thus, the method employing the SIV protocol provides a wireless network power savings protocol that permits stations to remain in a sleep mode until a pre-scheduled time, avoiding contention for the channel and the power that would otherwise be wasted during such contention. In addition the exemplary method of the SIV protocol, facilitates multiple transmissions within one beacon interval.

Scheduling Architecture

The hierarchical scheduling architecture of the present invention is employed for QoS provisioning and power savings. In this architecture, a "per flow" based scheduling algorithm is performed on the host side, while a "priority" based scheduling is performed on the firmware. Such a scheduling architecture is particularly suitable for the Texas Instruments WLAN chips and other such devices where resources are generally abundant on the host while comparatively limited in the firmware.

Queue Management

Figure 8:
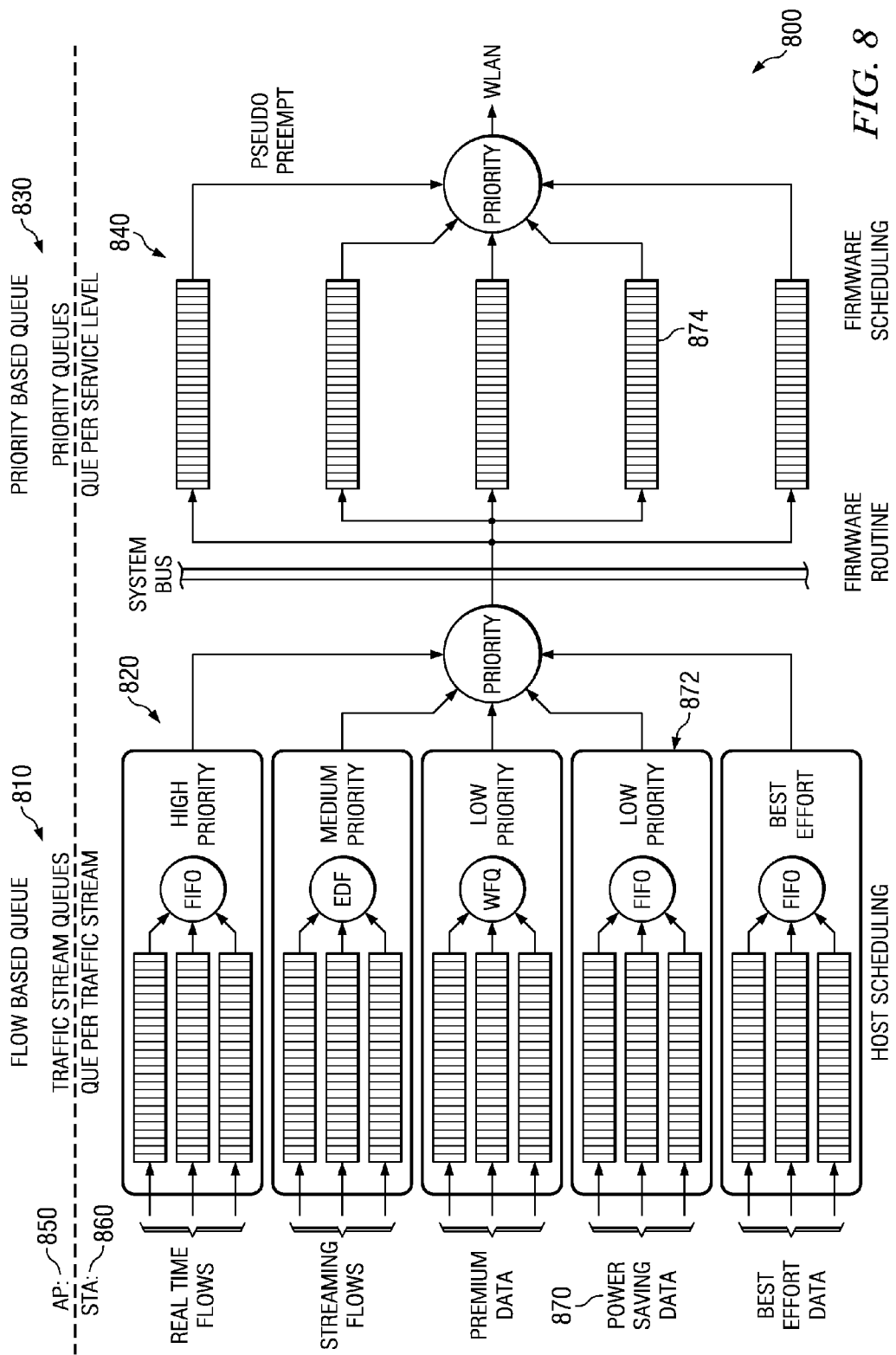
FIG. 8 is a diagram illustrating the operation of several exemplary scheduling and queue management algorithms in the host and firmware for a data exchange between a station and an access point in accordance with various aspects of the present invention.

FIG. 8 illustrates a diagram 800 of the operation of several exemplary scheduling and queue management algorithms in the host and firmware for a data exchange between a station and an access point in accordance with various aspects of the present invention.

Generally speaking, in one example a per flow based queue 810 is maintained at the host 820 while a per priority or service level based queue 830 is maintained on the firmware 840 where resources are limited. A service level is, for example, a measurement of the performance of a system or service such as a percentage of time a system is operative, or a percentage of successful data transactions.

In accordance with the invention, the queues are managed differently in an access point AP 850 than in a station STA 860. For example, for the AP 850 implementation, traffic stream queues are maintained on the host 820, whereas priority queues are maintained by the firmware 840. This means there may be a larger number of stream queues on the host 820 while only a small number of priority queues on the firmware 840.

For the STA 860 implementation, the host 820 maintains a queue per traffic stream, while the firmware 840 maintains a queue for each priority. It should be noted that a per stream queue on the host at a station may be desirable, as multiple streams belonging to the same priority may co-exist. For example, a user may simultaneously have streaming video and video conferencing. It may be improper to put these two traffic flows in different priorities. Therefore, scheduling may need to be performed on these two streams, thus a per stream queue may be preferred in some situations.

The current draft of 802.11e, however, does not require data frames to match the TID in the QoS Poll frame. If any future revision requires otherwise, the firmware may maintain a separate queue for each Tspec on the station side.

The Scheduling Algorithm

As illustrated in FIG. 8, in accordance with the present invention, a per flow based scheduling algorithm 810 is used on the host side 820. A data frame transferred to the MAC from an upper layer is first put into the corresponding flow based queue 810 (e.g., POWER SAVING DATA 870 is put into the power saving queues 872) on the host side 820. Queued frames will then be scheduled onto the firmware 840 using the algorithms (e.g., WFQ, or EDF as shown in association with the STREAMING FLOWS and PREMIUM DATA of FIG. 8).

A per priority based scheduling 830 is employed on the firmware 840. The firmware 840 places the traffic into a corresponding priority queue 830 and will schedule the frames onto the wireless channel using a simple strict priority. For example, POWER SAVING DATA 870 put in the flow based queues 872 is placed into a corresponding priority based queue 874 for scheduling onto the WLAN.

A poll frame will be generated at the host and go through the same path as data, except that the poll does not need policing on the host. Also, since no data is associated with a poll, only certain parameters need to be transferred from the host to the firmware and the actual polling frame can be generated with the assistance of pre-stored templates.

Observations for Scheduling Power Saving Traffic

Power saving traffic is dedicated by a particular priority on the firmware side and served using a First In First Out memory (FIFO) to reduce complexity. The inventor of the present invention has discovered that the transmission order of power saving traffic can be a factor determining when a station will go to sleep. Consequently, the inventor has realized that the scheduling algorithm on the host should be performed carefully in order to minimize the total power consumption of the power saving stations. To this end the inventor has made two key observations.

First, it is optimal to send out all the data of a station consecutively and instruct the station back to the sleep mode using, for example, the MORE_DATA bit once the transmission is finished. Otherwise, if this action were not taken, a station may needlessly remain awake consuming power on the channel decoding another station's traffic before the reception of all its own data.

Secondly, it is optimal to first transmit to the station with the smallest interval for transmitting all its data (the scheduled amount of data in the current beacon interval TBTT). One reason for this is that powering on and off different modules incurs additional power consumption and delay. By first grouping together the short transmissions to different PS stations, in accordance with an aspect of the present invention, the PS stations may be instructed to remain awake after reception of the beacon to receive their scheduled transmission in order to avoid this additional power consumption. For example, in one WLAN device, a break-even point of this additional power consumption in powering on and off, may be about 10 ms. Thus, a number of these short transmissions may be transmitted within this first 10 ms window, wherein it is not advantageous for a station to enter the sleep mode because this may actually incur more power than simply staying awake for receiving a stations' transmission. Then, after each PS station has received its corresponding transmission, the station is instructed to enter sleep mode.

Figure 9:
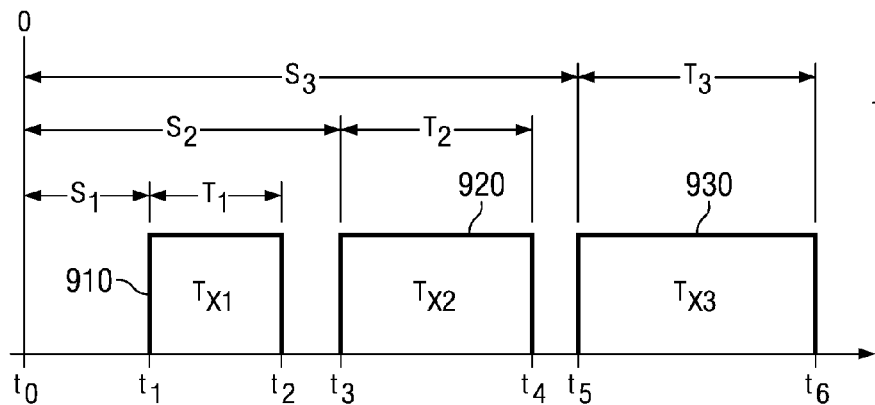
FIG. 9 is a timing diagram illustrating of three exemplary short data transmissions that are grouped, scheduled, and transmitted by the AP to three different PS stations in accordance with an aspect of the present invention.

FIG. 9, for example, illustrates a timing diagram 900, of three exemplary short transmissions $T_{x1}$ 910, $T_{x2}$ 920, and $T_{x3}$ 930 initiated, scheduled, and transmitted by the AP to three different stations (i), where station i=1, 2, 3 . . . . Each transmission $T_{xi}$ has a total transmission time (T), where this transmission time $T_{(i)}=T_1, T_2, T_3 \ldots$ . Each transmission $T_{xi}$ is also scheduled by the AP for transmission to station (i) at time $S_{(i)}=S_1, S_2, S_3 \ldots$ after receipt of the beacon from the AP. Note, that this type of grouping is, in one aspect of the invention, accomplished by scheduling the shortest transmissions first, for example, within the 10 ms break-even window. Thus in the scheduling, because $T_1<T_2<T_3< \ldots T_i$, then the transmissions $T_{x1}$ 910, $T_{x2}$ 920, and $T_{x3}$ 930 are scheduled such that $S_1<S_2<S_3 \ldots S_i$ respectively.

Another reason to first transmit to the station with the smallest interval for transmitting all its data, is that the pre-scheduled wakeup time for a PS station is typically not an exact match to the actual transmission time. This is because the actual transmission time depends on, for example, traffic arrival of a higher priority and varying channel conditions. Therefore, the shorter the pre-scheduled time, the less uncertainty there will be in the transmission time because the chance of interruption by a higher priority task is less. With less uncertainty in the transmission time, the closer the actual transmission time will be to the pre-scheduled time. Thus, by arranging the transmission of PS traffic in increasing order of transmission times, the total pre-scheduled time to all the stations on a WLAN can be minimized.

Figure 10:
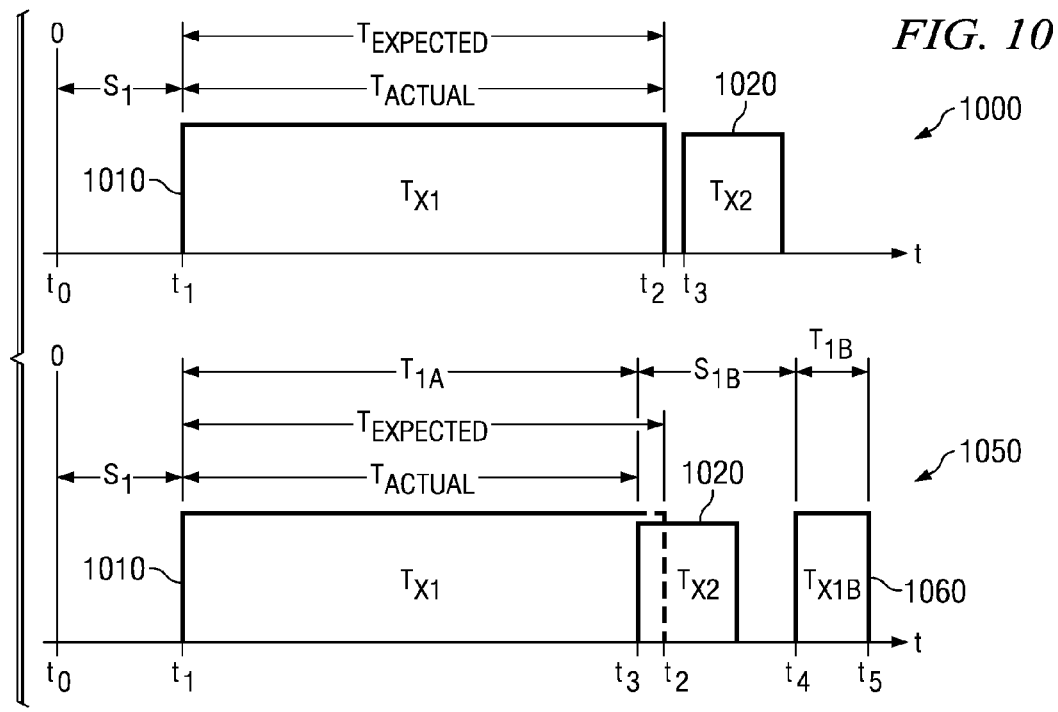
FIG. 10 is a timing diagram illustrating the compounding of scheduling time uncertainty in longer transmission times as a result of intervening higher priority traffic and channel conditions in accordance with an aspect of the present invention.

FIG. 10 illustrates a timing diagram of the compounding of scheduling time uncertainty in longer transmission times as a result of intervening higher priority traffic and channel conditions. Waveform 1000 of FIG. 10 illustrates a longer transmission $T_{x1}$ 1010 with an expected transmission time $T_{expected}$ that is scheduled to be received at station 1 based on scheduled time $S_1$ at time $t_1$. After the beacon, transmission $T_{x1}$ is actually received at station 1 at time $S_1$ as was expected, resulting in the total transmission time $T_{Actual}=T_{Expected}$.

Shortly thereafter, another higher priority transmission $T_{x2}$ 1020 is also transmitted by the AP and received at station 2, without interference to the station 1 transmission $T_{x1}$.

Waveform 1050 of FIG. 10, however, illustrates another possible outcome as a result of varying channel conditions or other traffic variables particularly with longer transmission times. Again, the longer transmission $T_{x1}$ 1010 with an expected transmission time $T_{expected}$ is scheduled to be received at station 1 based on scheduled time $S_1$ at time $t_1$. After the beacon, transmission $T_{x1}$ is again actually received at station 1 at time $S_1$ as was expected, but before transmission $T_{x1}$ 1010 is actually completed, another, higher priority, transmission $T_{x2}$ 1020 to station 2 interrupts $T_{x1}$ 1010 resulting in a transmission time $T_{Actual}$ ($T_{1a}$) not equal to $T_{Expected}$. Because transmission $T_{x1}$ 1010 is now incomplete, at about the time that $T_{x1}$ 1010 was interrupted by higher priority transmission $T_{x2}$ 1020, the MORE_DATA bit is set equal to 1, and a new scheduled time $S_{1b}$ is scheduled for station one. Based on the new scheduled time $S_{1b}$ received at time $t_4$, the remaining transmission $T_{x1b}$ 1060 to station one is received. As illustrated, the actual transmission time is now $T_{Actual}=T_{1a}+T_{1b}$, which due to handling overhead required more total transmission time than $T_{Expected}$ and requires a greater overall delay of the transmission. Additionally, informing the new schedule time $S_{1b}$ to station one requires an additional SIV frame and powering down/up station one will incur additional energy consumption.

Alternatively, if the AP chooses not to send out another schedule to the station and immediately transmit the remaining data following $T_{x2}$, station one will remain awake through the transmission periods of $T_{x1}$, $T_{x2}$, $T_{x1b}$, resulting in a total $T_{actual}=T_{1a}+T_{1b}+T_{x2}$.

Thus, longer transmission times are more subject to interruptions, compounding into still longer transmission times and delays. Therefore, the inventor realized that by ordering the transmission of PS traffic in increasing order of transmission times, the total pre-scheduled time to all the stations on a WLAN may be minimized. Transmitting the shortest transmissions first, then, creates the least chance of interruption to the remaining transmissions. This may be best understood by examining the counterpoint to this assertion. Again referring to the situation illustrated by FIG. 10, of a longer transmission $T_{x1}$ 1010. If, by contrast, an algorithm was devised wherein this longer transmission $T_{x1}$ 1010 was first scheduled and transmitted, and was subsequently interrupted by higher priority transmission $T_{x2}$ 1020, all remaining station transmissions would be affected. More stations would require new scheduled times and further delays than with the transmission time algorithm of the present invention.

Figure 11:
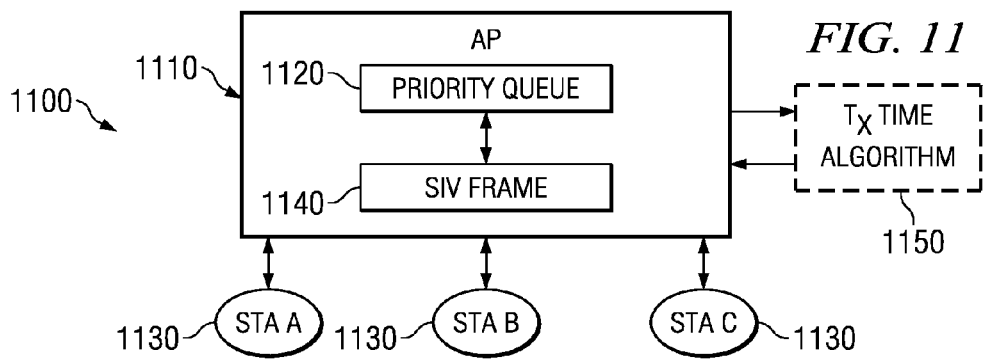
FIG. 11 is a simplified block diagram of an exemplary power savings system used in a WLAN utilizing a priority queue, an SIV frame protocol, and a transmission time calculation and transmission prioritization algorithm in accordance with various aspects of the present invention.

FIG. 11 illustrates a simplified block diagram 1100 of an exemplary power savings system used in a WLAN in accordance with various aspects of the present invention. The power savings system 1100 comprises an access point 1110 having a priority queue 1120, one or more stations 1130, an SIV frame 1140 used in association with an SIV protocol, and an algorithm 1150 for calculating a transmission time of data transmissions for the stations 1130, and for prioritizing the scheduling of the transmissions according to the SIV protocol, as stored in the priority queue 1120 based on an increasing order of transmission times.

Figure 12:
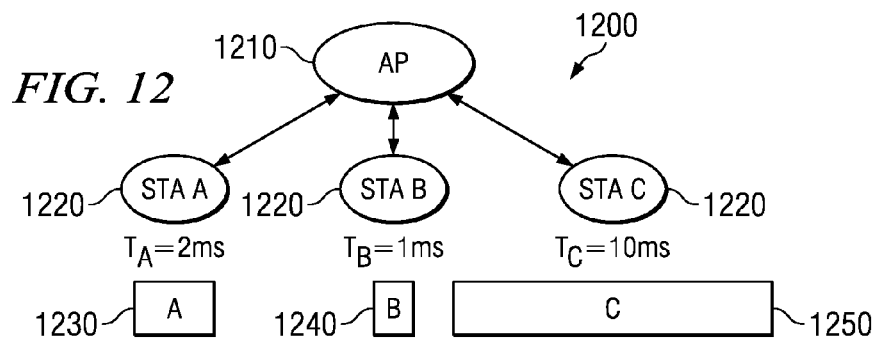
FIG. 12 is a simplified block diagram of an exemplary WLAN illustrating a different transmission time requirement to each station of the WLAN.
Figure 13:
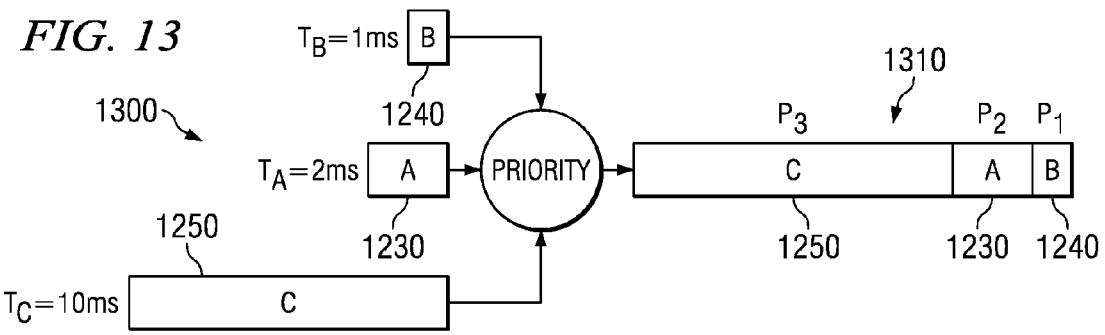
FIG. 13 is a diagram illustrating the results of the priority ordering of the optimum scheduling algorithm in accordance with an aspect of the present invention.
Figure 14:
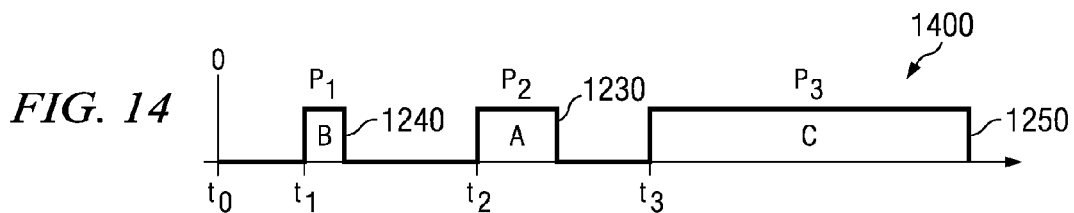
FIG. 14 is a timing diagram illustrating the transmission timing response of the prioritization ordering of the transmission time scheduling algorithm in accordance with an aspect of the present invention.

FIGS. 12-14 further illustrate simplified forms of the prioritizing, ordering, and scheduling of the data transmissions based on the transmission times in accordance with several aspects of the present invention. FIG. 12, for example, illustrates a simplified block diagram of an exemplary WLAN system 1200 for saving power in accordance with the invention. WLAN system 1200 comprises an AP 1210 and three stations 1220. Each station 1220 is to receive a transmission ($T_x$) having a different transmission time T from the AP. For example, station A is to receive a transmission A ($T_{xA}$) 1230 having a transmission time $T_A$=2 ms, station B will receive a transmission B ($T_{xB}$) 1240 having $T_B$=1 ms, and station C is to receive a transmission C ($T_{xC}$) 1250 having a transmission time $T_C$=10 ms.

FIG. 13 is an exemplary diagram of the operation of the optimum scheduling algorithm 1300 illustrating the results of the priority ordering of the transmissions in association with the WLAN system 1200 of FIG. 12. Variables associated with the three exemplary transmissions $T_{xA}$ 1230, $T_{xB}$ 1240, and $T_{xC}$ 1250 are first processed by the transmission time algorithm to compute the expected transmission times $T_A$=2 ms, $T_B$=1 ms, and $T_C$=10 ms to stations A, B, and C respectively. Based on these computed times, a higher priority is assigned to the shorter transmission times, and the transmission data packets are arranged according to this increasing order of transmission time as stored in packet buffer 1310.

For example, the transmission time calculated for the data transmission $T_{xB}$ 1240 to station B is shortest at $T_B$=1 ms, so is assigned the highest priority level $P_1$, as represented by its "first-in" position to the far right in the packet buffer 1310. Likewise, station A's $T_{xA}$ 1230 transmission time is next shortest at $T_A$=2 ms, so is assigned the next highest priority level $P_2$ next to $T_{xB}$ 1240 in the packet buffer 1310. Finally, station C's transmission $T_{xC}$ 1250 is the longest of the three transmission times at $T_C$=10 ms, so is assigned the lowest priority level $P_3$ in the last-in position next to $T_{xA}$ 1230 in the packet buffer 1310.

FIG. 14 illustrates a timing diagram of the response 1400 of the transmission ordering produced by the transmission time prioritizing and scheduling algorithm of FIG. 13. Because data transmission $T_{xB}$ 1240 to station B is shortest at $T_B$=1 ms, this transmission is scheduled for first transmission by the AP using the SIV frame and protocol. Thus, transmission $T_{xB}$ 1240 is first to appear on the timing diagram response 1400 at time $t_1$. In like manner, data transmission $T_{xA}$ 1230 to station A is next shortest at $T_A$=2 ms, and is scheduled for the second transmission using the SIV frame and protocol appearing on the timing diagram at time $t_2$. Finally, data transmission $T_{xC}$ 1250 to station C is longest at $T_C$=10 ms, and is scheduled for the third and final transmission using the SIV frame and protocol appearing on the timing diagram at time $t_3$.

Therefore, the present invention provides a wireless network power savings system and protocol that permits stations to remain in a sleep mode until a pre-scheduled time optimally determined using an algorithm that minimizes the overall transmission times, interruptions and delays, and avoids contention for the channel and the resultant power that would otherwise be wasted during such contention.

Calculating Transmission Time

The total transmission of the frames to a certain PS station is related to the transmission rate, the ACK scheme, the packet lengths, and the number of bits in the queue. Following is an example of calculating the transmission time for a normal ACK scheme. No Ack and Burst Ack cases are trivial extensions.

In the algorithm of the present invention, the total transmission time T may be calculated as:

$$T=Q*((MAC\_\text{header}+PHY\_\text{header})/\text{Transmission\_rate}+2*SIFS\_\text{TIME}+ACK\_\text{time})+L/\text{Transmission\_rate}. \quad (1)$$

T is the total transmission time of the data frames to a PS station;

Q is the number of frames;

MAC_header is the MAC layer header length;

PHY_header is the physical layer header length;

Transmission_rate is the transmission rate of the wireless network;

SIFS_TIME is the time delay of the interframe space;

ACK_time is the time required by the ACK scheme; and

L is the total MAC payload in bits in the queue FIGS. 15-18 are flow charts illustrating various method aspects of saving power in a wireless network using an SIV protocol and a transmission time calculation algorithm in accordance with the power saving system of FIG. 11, and various aspects of the present invention.

Figure 15:
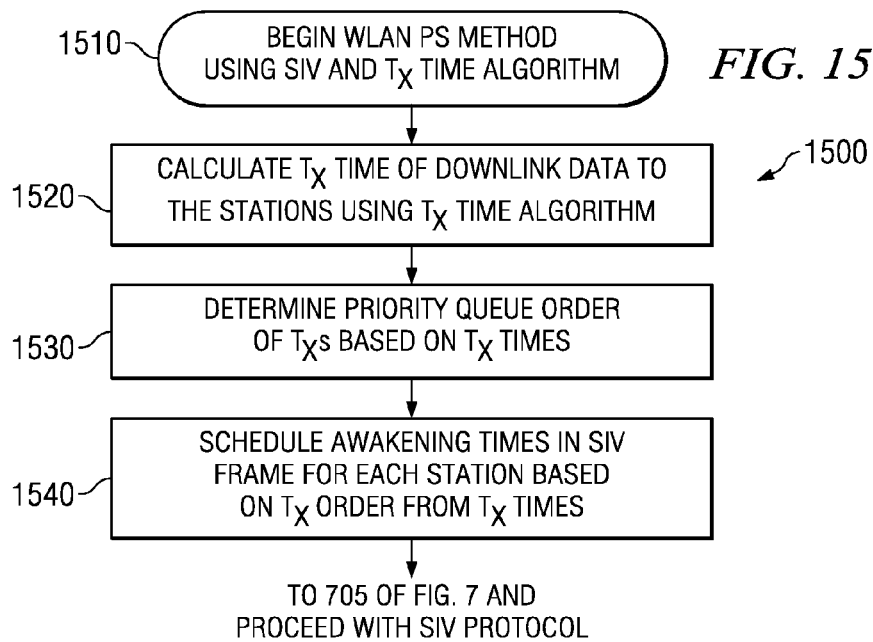

Referring now to FIG. 15, an exemplary method 1500 is illustrated for saving power in a wireless network comprising an access point AP having a priority queue, one or more stations (STAs), an SIV frame and protocol, and an algorithm for calculating the transmission time of downlink data for the stations. Method 1500 further includes prioritizing the scheduling of the transmissions according to the SIV protocol, as stored in the priority queue based on an increasing order of transmission times in accordance with the present invention.

While the method 1500 and other methods herein are illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the present invention. Furthermore, the method 1500 according to the present invention may be implemented in association with the network elements, algorithms, protocols and formats illustrated and described herein as well as in association with other elements, algorithms, protocols and formats not illustrated.

The method 1500 comprises initially accessing the current data to be transmitted to each station using the algorithm, and calculating the total transmission time T to each station. The algorithm and the priority queue in the access point are then used to determine and arrange the priority order of the transmissions based on the transmission time calculated for each station. The awakening time is then scheduled utilizing the SIV frame and protocol for each station based on the transmission order from the transmission times. The method 1500 further comprises awaking the STA at a periodic time to monitor a beacon transmitted from the AP, and determining whether an association ID of the station is indicated within a TIM of the beacon. If the STAs association ID (AID) is not indicated and there is no uplink data to be transmitted, the STA returns to a sleep mode until a next beacon from the AP.

Method 1500 also includes determining whether uplink data is to be transmitted from the STA to the AP. If the stations' AID indicates uplink data is to be transmitted to the access point, the station remains awake, receives a CC from the AP and returns an RR back to the AP. When the SIV frame is received and a scheduled time for uplink is determined based on the SIV, the station is permitted to return to the sleep mode until the scheduled time for the uplink. The method then includes awaking at the scheduled time, sending a request for uplink CF data, receiving a poll for uplink CF data and transmitting uplink CF data to the AP.

Otherwise, if the stations' AID is indicated and downlink data is to be received from the AP, the station remains awake waiting for the SIV frame from the AP. When the SIV frame is received and a scheduled time for downlink is determined based on the SIV, the station is permitted to return to the sleep mode until the scheduled time for the downlink. The method then includes awaking at the scheduled time and receiving the downlink CF data, and returning to the sleep mode until the next beacon.

The exemplary power saving method 1500 of FIG. 15, in accordance with the wireless network of FIG. 11, begins at 1510. Initially, at 1520, the access point accesses the current data to be transmitted (e.g., Tx, downlinked) to each station using the algorithm, and calculates the total transmission time T to each station. The algorithm and the priority queue in the access point are then used at 1530 to determine and arrange the priority order of the transmissions based on the transmission time calculated for each station. The awakening time is then scheduled at 1540 utilizing the SIV frame and protocol for each station based on the transmission order from the transmission times.

Thereafter, the power savings method of the present invention continues as discussed in association with the SIV protocol of method 900 of FIG. 7 for a wireless network.

Thus, the present invention provides a wireless network power savings system and protocol that permits stations to remain in a sleep mode until a pre-scheduled time optimally determined using an algorithm that minimizes the overall transmission times, interruptions and delays, and avoids contention for the channel and the resultant power that would otherwise be wasted during such contention.

Scheduling—At the AP

At the beginning of a beacon transmission, the AP will scan the queues corresponding to different PS stations and setup the TIM field in the beacon. AP then calculates the total transmission time for transmitting the data to each PS station, respectively. In general, assume $$T_1 < T_2 < \ldots < T_i < \ldots < T_N, \quad (2)$$

where $T_i$ denotes the total time needed of transmitting the data to station i; and N denotes the total number of backlogged stations.

The AP then will setup the SCHEDULE field of SIV as $$[0, T_1, T_2, \ldots, T_i, \ldots, T_{N-1}]. \quad (3)$$

The AP will then transmit the data, for example, to firmware in the order $$1, 2, \ldots i, \ldots, N. \quad (4)$$

Notice during the mean time of the PS traffic transmission, frames may still arrive. If the later arrivals are served together with those arrived before calculating the SIV information, the schedule information may no longer be correct. There are two options to handle this situation.

First, the AP can mark the traffic arrived after sending out the SIV and stop serving the same queue once the mark is reached. The MORE_DATA field in the last packet before the mark should be cleared to zero upon the reception and decoding of which station will enter sleep mode. Transmission from this queue should then be disabled. Frames arrived after the SIV will be buffered until the next beacon.

Second, the AP can serve the frame regardless of the arrival time. Once the queue has been emptied for a particular station, the MORE_DATA field in the last packet pertaining to this queue should be cleared to zero upon the reception and decoding of which station should enter sleep mode. Notice that once a queue has been emptied, the transmission from this queue should be disabled until the next beacon, even if additional packets arrive from an upper layer.

The second method will have higher power consumption than the first method, as the actual transmission time to subsequent PS stations will be delayed due to the new arrivals and hence further diverge from the scheduled wake up time. This also means that subsequent PS stations may be required to decode more irrelevant data.

Figure 16:
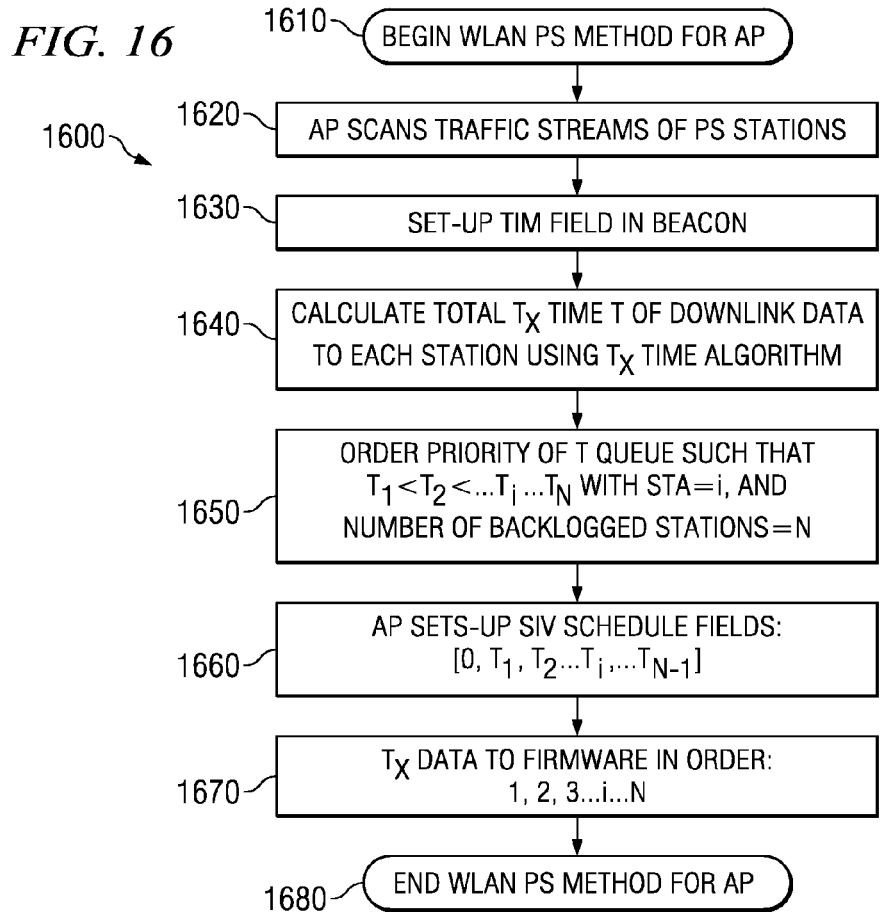

FIG. 16 is a flow chart illustrating a method 1600 of saving power in a wireless network using an SIV protocol and a transmission time calculation algorithm in accordance with the access point and the PS system of FIG. 11 of the present invention.

The method 1600 begins at 1610. Initially, at 1620, an access point scans the current traffic streams of data to be transmitted to one or more power save (PS) stations (i). At 1630, a TIM field is set-up in the beacon as shown and previously described in association with 140c of FIG. 3. At 1640, a total transmission ($T_x$) time T of the data to be downlinked to each station (i) is calculated using the transmission time and prioritizing algorithm. The algorithm (e.g., from equation (1) above) and a priority queue in the access point are then used at 1650 to arrange the transmissions to the PS stations by a transmission priority order based on an increasing order of the transmission time calculated for each station, for example, as shown and discussed in association with equation (2) above. The awakening time is then scheduled at 1660 utilizing the SIV frame and protocol for each station based on the priority ordering from the transmission times, for example, as shown and discussed in association with equation (3) above. Then, the transmission data is transferred, for example, to firmware in the order established as shown and discussed in association with equation (4) above, wherein transmissions are served to the PS stations according to the schedule.

Figure 18:
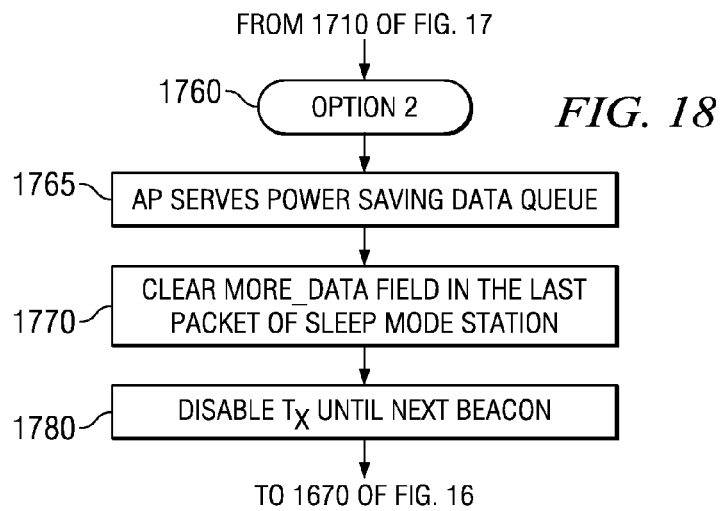

FIGS. 17-18 illustrate two options of a method 1700, for handling new PS data that may arrive while transmitting the current data to firmware at 1670 of FIG. 16. In other words, method 1700 of FIGS. 17 and 18 occurs in parallel with 1670 of FIG. 16, to provide a method of watching for and handling new PS data while transmitting the current data. Data is not dumped in one large batch; rather, data is continuously transferred to the firmware as buffer space is cleared by data transmission to the wireless channel. In FIG. 17, for example, the method 1700 begins at 1710, where a determination is made whether new PS traffic data may have arrived during the PS traffic transmission. If the new data arrivals are served together with those arrived before calculating the SIV information, the schedule information may no longer be correct. Therefore, two options (option 1 and option 2) are presented to handle this situation.

In option 1 at 1720, if new PS traffic has arrived at 1710, then the SIV frame schedules will be transmitted at 1730, and the new power save traffic will be marked at 1735. When the mark has arrived at 1740 in the $T_x$ of the PS station, the MORE_DATA field in the last packet of data before the mark is cleared to zero, and upon reception of which PS station is instructed to enter sleep mode. At 1750, the $T_x$ is disabled, and further power saving data is buffered until the next beacon. Thereafter, the PS method 1700 using option 1 ends and returns to 1670 of FIG. 16.

In FIG. 18, option 2 illustrates another method of handling new transmissions, beginning at 1760. In option 2, if new PS traffic has arrived at 1710, then the AP continues to serve the power saving data at 1765 regardless of the arrival time. When the $T_x$ queue has been emptied at 1770 for a particular PS station, the MORE_DATA field in the last packet of data is cleared to zero, and upon reception of which PS station is instructed to enter sleep mode. At 1780, the $T_x$ is disabled until the next beacon even if subsequent packets arrive from an upper layer. Thereafter, the PS method 1700 using option 2 ends and returns to 1670 of FIG. 16.

Otherwise, if new PS traffic has not arrived at 1710 of FIG. 17, then the PS method 1700 ends and returns to 1670 of FIG. 16.

Scheduling—At the Stations

A station i will wake up periodically for the pre-specified beacon interval. Upon reception of the beacon, the station determines if its' AID matches that of the AID in the TIM field of the beacon. If no AID match is found, the station will immediately go back to sleep; otherwise the station will remain awake.

An awake power saving station i will decode the SIV frame following the beacon. Based on the scheduled wakeup time ($S_i$) in the SIV frame, the PS station has two different actions depending on the pre-wakeup guard time $\Delta$ (the time to wake up earlier than the scheduled time in order to guarantee reception of a transmission).

If $S_i <= \Delta$ (or a predetermined time interval associated with the guard time), the station will remain awake and decode the frames on the wireless channel. Upon the reception of a frame addressed to itself along with the MORE_DATA bit set to zero, the station will go to sleep and prepare for waking up at the next beacon.

If $S_i > \Delta$, the station will go to sleep and wake up at $S_i$ to decode the frame on the wireless channel. Upon the reception of a frame addressed to itself along with the MORE_DATA bit set to zero, the station will go to sleep and prepare for waking up at the next beacon.

For example, FIG. 19 is a flow chart illustrating a method 1800 of saving power in a wireless network using an SIV protocol and a transmission time calculation algorithm in accordance with the one or more PS stations and the PS system of FIG. 11 of the present invention.

The method 1800 begins at 1810. Initially, at 1820, a PS station (i) awakes at the periodic beacon interval and checks to see if its AID matches that of the TIM field of the beacon. If, at 1820, the AID does match, the SIV frame following the beacon is decoded at 1830. A determination is then made at 1840, according to the scheduled wakeup time ($S_i$) in the SIV frame, whether the PS station has sufficient time remaining to enter sleep mode before the scheduled wakeup time. Further, this pre-wakeup guard time ($\Delta$) is also predetermined based on a time interval which ensures actually saving power, as a very short sleep mode interval may, once again, fail to ensure a power savings. Thus, at 1840, if $S_i$ is less than or equal to the pre-wakeup guard time ($\Delta$) at 1840, then the PS station remains awake and decodes the frames on the WLAN at 1850. Otherwise, if $S_i$ is greater than the pre-wakeup guard time $\Delta$ at 1840, then the PS station will enter sleep mode and awaken at $S_i$ to decode the frame on the wireless channel at 1860.

Thereafter, at 1870, upon decoding a frame addressed to the PS station (AID match) along with the MORE_DATA field set to zero, the station will return to the sleep mode at 1880 until the next beacon. However, if at 1870 the AID does not match that of the PS station, or the MORE_DATA field is not set to zero, the PS station remains awake and decodes a further frame on the WLAN at 1850.

Otherwise, if the AID does not match, at 1820, the PS station (i) returns to the sleep mode at 1880, and the WLAN PS method 1800 for PS stations ends at 1895.

Scheduling QoS Traffic

QoS traffic is easily accommodated via the priority-based architecture of the present invention. Upon reception of priority QoS traffic from a higher layer, the strict priority scheduler will deliver the QoS traffic by interrupting the ongoing PS data (as indicated by the "Pseudo Preempt" shown in FIG. 8 as a special case to provide an interrupt). It should also be noted that power saving data 870 has a higher priority than best effort data and hence will not be disrupted by best effort data.

The presence of QoS data may delay the transmission of the PS data and hence make the wakeup time of PS station earlier than necessary. This also indicates that the PS station may have to decode irrelevant data and introduce more power consumption. Two possible solutions to this scenario are indicated herein.

First, the scheduler can perform its schedule and the PS station may simply wait for its data. Second, the scheduler can resend an SIV frame to the station. The schedule within the frame should be the original schedule time plus the transmission time that has been and will be devoted to QoS traffic before the transmission of PS data.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A system for saving power in a wireless network, said system comprising:
   an access point having a priority queue;
   a schedule information vector (SIV) frame comprising:
      one or more schedules of wake-up times, corresponding to one or more stations, respectively;
      an Association ID (AID) field to numerate the one or more association $ID_s$ of the one or more stations for identifying one or more of the stations;
      an $N_{SIV}$ field to denote the number of stations scheduled in the current frame by denoting the number of association $ID_S$ contained in the AID field; and
      an algorithm for calculating a transmission time duration of downlink data from the access point to each of the stations,
   wherein the access point originates and transmits to the one or more stations the SIV frame of the scheduled wake-up times having a transmission order based on the transmission time duration calculations stored within the priority queue of the access point, and wherein the one or more stations selectively awake from a sleep mode for data transmission therewith based on the schedule.

2. The system of claim 1, wherein the SIV frame comprises:
- a schedule field comprising one or more schedules for scheduling the next wakeup time of one or more stations, based on one of an offset relative to a last beacon or a next beacon, and an offset relative to the current SIV frame; and
- wherein the one or more stations are directed to uplink or downlink CF data, thereby minimizing time the station must remain awake, saving power while minimizing channel contention.

3. The system of claim 1, wherein the SIV frame further comprises a listening window field to denote the time period following the scheduled wake-up time, during which the AP should send network traffic.

4. The system of claim 1, wherein the SIV frame is transmitted to the stations within a TIM frame of a beacon.

5. The system of claim 1, wherein the access point is configured to generate a TSPEC element comprising a PS interval for specifying a timing offset relative to the current transmission.

6. The system of claim 1, wherein the access point is further operable to dynamically adjust one or more of the scheduled wake-up times of the stations, a sequence of wake-up times, a periodic wake-up time, a plurality of wake-up times, and a duration of the wake-up times of the stations, based on one or more of network traffic, traffic buffering time, data priorities, data length, and data rates.

7. The system of claim 6, wherein the dynamic adjustments are made by the access point in the fields of the SIV frame.

8. The system of claim 1, wherein the access point is further operable to unicast the SIV to one station, thereby providing self correction or retransmission of a schedule for an individual station.

9. A system for saving power in a wireless network, said system comprising:
- an access point having a priority queue;
- a schedule information vector (SIV) frame comprising:
  - one or more schedules of wake-up times, corresponding to one or more stations, respectively; and
  - an algorithm for calculating a transmission time duration of downlink data from the access point to each of the stations,
- wherein the access point originates and transmits to the one or more stations the SIV frame of the scheduled wake-up times having a transmission order based on the transmission time duration calculations stored within the priority queue of the access point, and wherein the one or more stations selectively awake from a sleep mode for data transmission therewith based on the schedule,
- wherein the access point is further operable to unicast the SIV frame to a station to alter one or more of the scheduled wakeup times of the station in response to errors on the network and to the arrival of higher priority data.

10. A system for saving power in a wireless network, said system comprising:
- an access point having a priority queue;
- a schedule information vector (SIV) frame comprising:
  - one or more schedules of wake-up times, corresponding to one or more stations, respectively; and
  - an algorithm for calculating a transmission time duration of downlink data from the access point to each of the stations,
  - wherein the access point originates and transmits to the one or more stations the SIV frame of the scheduled wake-up times having a transmission order based on the transmission time duration calculations stored within the priority queue of the access point, and wherein the one or more stations selectively awake from a sleep mode for data transmission therewith based on the schedule,
  - further providing an SIV protocol configurable to allow the access point to ignore current scheduling activities and perform scheduling in response to errors on the network and to the arrival of higher priority data.

11. The system of claim 1, wherein the transmission order stored in the priority queue of the access point is ordered according to a higher priority assignment for the shortest transmission time duration.

12. The system of claim 1, wherein the priority queue of the access point is operable to order and enable the shortest transmission time duration downlink first.

13. The system of claim 12, wherein the priority queue is further operable to order subsequent transmissions based on which transmission has the shortest transmission time duration.

14. A system for saving power in a wireless network, said system comprising:
- an access point having a priority queue;
- a schedule information vector (SIV) frame comprising:
  - one or more schedules of wake-up times, corresponding to one or more stations, respectively; and
  - an algorithm for calculating a transmission time duration of downlink data from the access point to each of the stations,
  - wherein the access point originates and transmits to the one or more stations the SIV frame of the scheduled wake-up times having a transmission order based on the transmission time duration calculations stored within the priority queue of the access point, and wherein the one or more stations selectively awake from a sleep mode for data transmission therewith based on the schedule,
  - wherein the algorithm for calculating the transmission time duration of downlink data each of the stations is represented by $T=Q*((MAC\_header+PHY\_header)/Transmission\_rate+2*SIFS\_TIME+ACK\ time)+L/Transmission\_rate$, where T is the total transmission time of the data frames to a PS station, Q is the number of frames, MAC_header is the MAC layer header length, PHY-header is the physical layer header length, Transmission_rate is the transmission rate of the wireless network, SIFS_TIME is the time delay of the interframe space, ACK time is the time required by the ACK scheme, L is the total MAC payload in bits in the queue.

15. The system of claim 14, wherein the algorithm is further operable to aggregate together a plurality of short transmissions comprising all currently scheduled data to a PS station before calculating the transmission time duration.

16. A method of saving power in a wireless network comprising an access point, a schedule information vector (SIV) frame having an Association ID (AID) and an $N_{SIV}$ field, and an algorithm for calculating a transmission time duration of downlink data for each of one or more stations, the method comprising:
- calculating the transmission time duration of data to be downlinked from the access point to each of the stations using the algorithm;
- determining a priority queue ordering of the transmissions based on the transmission time duration calculated for each station;

numerating the one or more association $ID_S$ of the one or more stations for identifying one or more of the stations in the Association ID (AID) field of the SIV frame;

denoting in the $N_{SIV}$ field of the SIV frame the number of stations scheduled in the current frame by denoting the number of association $ID_S$ contained in the AID field; and scheduling an awakening time in the SIV frame for each station of one or more stations based on the transmission order from the transmission time duration calculations and order given in AID field.

17. The method of claim 16, further comprising:

awaking a station from a sleep mode to monitor a beacon from the access point;

determining whether the station's association ID is indicated in the beacon;

returning the station to the sleep mode if the station's association ID is not indicated;

transferring the SIV frame containing schedule data to the station; and returning the station to the sleep mode and awakening the station for data transmission therewith based on the schedule data.

18. The method of claim 17, further comprising:

determining whether uplink data is to be transmitted from the station to the access point if the station's association ID is indicated in the beacon;

keeping the station awake; and sending a CC from the access point to the station and sending an RR back from the station to the access point prior to receiving the SIV.

19. The method of claim 18, wherein returning the station to sleep mode comprising returning the station to sleep mode after receipt of the SIV, and maintaining the station in sleep mode until the schedule data dictates that the station awaken.

20. The method of claim 17, further comprising:

determining whether downlink data is to be transmitted from the access point to the station if the station's association ID is indicated in the beacon; and keeping the station awake until SIV frame containing schedule data is received.

21. The method of claim 20, further comprising returning the station to sleep mode after receipt of the SIV frame, and maintaining the station in sleep mode until the schedule data dictates that the station awaken.

22. The method of claim 17, wherein awaking the station to monitor a beacon from the access point, comprises awaking the station at a periodic time to monitor a beacon from the access point.

23. The method of claim 17, wherein determining whether a station's association ID is indicated, comprises determining whether a station's association ID is indicated within a TIM of the beacon.

24. The method of claim 17, further comprising modifying the schedule data within a subsequent SIV frame based on one or more of network traffic, traffic buffering time, data priorities, data lengths and data rates.

25. The method of claim 17, further comprising:

determining whether new power save traffic frames have arrived at the access point before all the SIV frames have been scheduled;

marking the new power save traffic frames;

sending out the SIV frames containing the schedule data;

clearing a MORE_DATA field in the last packet before the mark;

stopping serving the priority queue when the mark has arrived;

allowing the station to go into sleep mode;

disabling the transmissions from the present priority queue; and buffering further SIV frames until the next beacon.

26. The method of claim 17, further comprising:

determining whether new power save traffic frames have arrived at the access point before all the SIV frames have been scheduled;

sending out the SIV frames containing the schedule data;

clearing a MORE_DATA field in the last packet of the priority queue;

allowing the station to go into sleep mode; and disabling further transmissions from the priority queue until the next beacon.

27. The method of claim 17, further comprising:

determining from the SIV frame received by a station whether the time remaining until the scheduled wake-up time Si is less than a pre-wakeup guard time $\Delta$;

decoding the SIV frame on the wireless channel if the time remaining until the scheduled wake-up time $S_i$ is less than a pre-wakeup guard time $\Delta$; and sleeping until the scheduled wake-up time $S_i$ less the pre-wakeup guard time $\Delta(S_i-\Delta)$ and decoding the SIV frame on the wireless channel if the time remaining until the scheduled wake-up time is greater than the pre-wakeup guard time $\Delta$.

28. The method of claim 27, further comprising:

determining whether the AID in an SIV frame matches that of a station's and whether the MORE_DATA bit is set to zero;

allowing the station to go back to sleep mode until the next beacon if the AID matches and the MORE_DATA bit is set to zero; and remaining awake to decode further SIV frames if either the AID does not match or the MORE_DATA bit is not set to zero.

* * * * *